(12) United States Patent
Hooker

(10) Patent No.: US 7,139,876 B2
(45) Date of Patent: Nov. 21, 2006

(54) MICROPROCESSOR AND APPARATUS FOR PERFORMING FAST SPECULATIVE POP OPERATION FROM A STACK MEMORY CACHE

(75) Inventor: Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 452 days.

(21) Appl. No.: 10/759,559

(22) Filed: Jan. 16, 2004

(65) Prior Publication Data

US 2004/0148467 A1 Jul. 29, 2004

Related U.S. Application Data

(60) Provisional application No. 60/440,767, filed on Jan. 16, 2003.

(51) Int. Cl.
*G06F 12/00* (2006.01)
(52) U.S. Cl. ....................... 711/132
(58) Field of Classification Search ............ 711/132
See application file for complete search history.

(56) References Cited

U.S. PATENT DOCUMENTS

| | | | |
|---|---|---|---|
| 3,401,376 A | 9/1968 | Barnes et al. | |
| 3,810,117 A | 5/1974 | Healey | |
| 5,043,870 A | 8/1991 | Ditzel et al. | |
| 5,500,950 A | 3/1996 | Becker et al. | |
| 5,751,990 A | 5/1998 | Krolak et al. | |
| 5,930,820 A * | 7/1999 | Lynch | 711/132 |
| 5,953,741 A | 9/1999 | Evoy et al. | |
| 5,956,752 A * | 9/1999 | Mathews | 711/204 |
| 5,960,467 A | 9/1999 | Mahalingaiah et al. | |
| 6,009,499 A | 12/1999 | Koppala | |
| 6,038,643 A | 3/2000 | Tremblay et al. | |
| 6,151,661 A | 11/2000 | Adams et al. | |
| 6,275,903 B1 | 8/2001 | Koppala et al. | |
| 6,415,380 B1 | 7/2002 | Sato | |

(Continued)

FOREIGN PATENT DOCUMENTS

CN 1391167 A 1/2003

(Continued)

OTHER PUBLICATIONS

"Dual On-Chip Instruction Cache Organization in High Speed Processors." *IBM Technical Disclosure Bulletin.* IBM Corp, New York, US. vol. 37, No. 12, Dec. 1994, pp. 213-214.
(In the file SCreport.pdf): Implementing a Stack Cache; Hensath, Morton, Sjodin; obtained from http://www.owlnet.rice.edu/~elec525/projects/SCreport.pdf; accessed on Aug. 13, 2003.

(Continued)

*Primary Examiner*—Matthew Kim
*Assistant Examiner*—Ryan A. Dare
(74) *Attorney, Agent, or Firm*—E. Alan Davis; James W. Huffman

(57) ABSTRACT

A stack cache memory in a microprocessor and apparatus for performing fast speculative pop instructions is disclosed. The stack cache stores cache lines of data implicated by push instructions in a last-in-first-out fashion. An offset is maintained which specifies the location of the newest non-popped push data within the cache line stored in the top entry of the stack cache. The offset is updated when an instruction is encountered that updates the stack pointer register. When a pop instruction requests data, the stack cache speculatively provides data specified by the offset from the top entry to the pop instruction, before determining whether the pop instruction source address matches the address of the data provided. If the source address and the address of the data provided are subsequently determined to mismatch, then an exception is generated to provide the correct data.

53 Claims, 18 Drawing Sheets

U.S. PATENT DOCUMENTS

| | | |
|---|---|---|
| 6,425,055 B1 | 7/2002 | Sager et al. |
| 6,532,531 B1 | 3/2003 | O'Connor et al. |
| 6,622,211 B1 | 9/2003 | Henry et al. |
| 6,671,196 B1 | 12/2003 | Civlin |
| 2002/0144061 A1 | 10/2002 | Faanes et al. |
| 2004/0133886 A1 | 7/2004 | Wu |
| 2004/0188959 A1 | 9/2004 | Kawamoto |

FOREIGN PATENT DOCUMENTS

| | | |
|---|---|---|
| GB | 2260429 | 4/1993 |
| GB | 2307319 | 5/1997 |

OTHER PUBLICATIONS (In the file JavaStack Cache.doc); Design Issues—Stack Cache; obtained from http://murray.newcastle.edu.au/users/students/1999/c9510422/design1.html; http://murray.newcastle.edu.au/users/students/1999/c9510422/design2.html; http://murray.newcastle.edu.au/users/students/1999/c9510422/design3.html; http://murray.newcastle.edu.au/users/students/1999/c9510422/design4.html; http://murray.newcastle.edu.au/users/students/1999/c9510422/architecture.html; accessed on Dec. 2, 2003.

(In the fine AMD Hammer micro architecture.pdf): AMD's Hammer micro architecture; http://chip-architect.com/news/hammer.jpg; accessed on Aug. 29, 2002.

* cited by examiner

Fast Pop Operation

Push Operation

Add to Stack Pointer Operation

Speculative Load from Stack Cache Operation

Normal Load from Stack Cache Operation

Load from Non-Stack Cache Operation

Fig. 10    Fast Pop from Stack Cache Timing
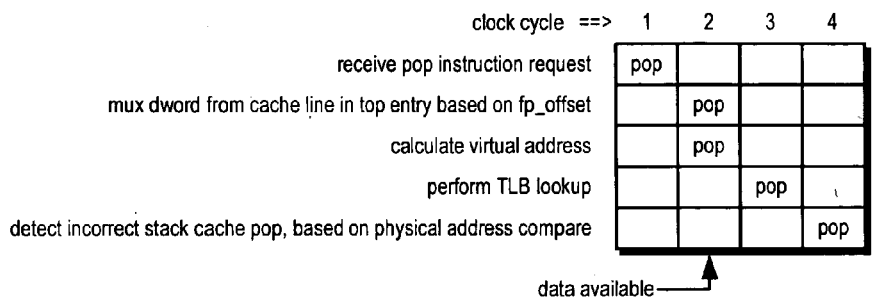
data available
Fig. 11    Speculative Load from Stack Cache Timing
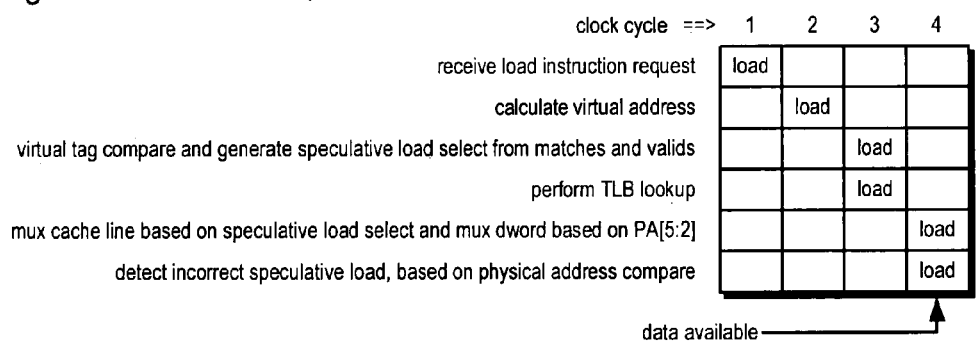
data available
Fig. 12    Normal Load from Stack Cache Timing
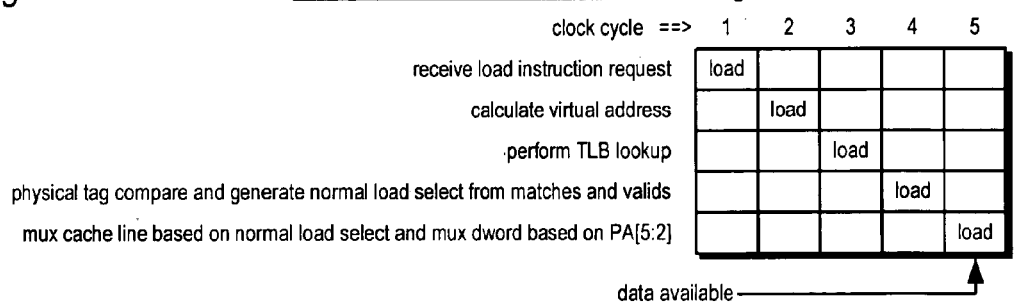
data available
Fig. 13    Load from Non-Stack Cache Timing
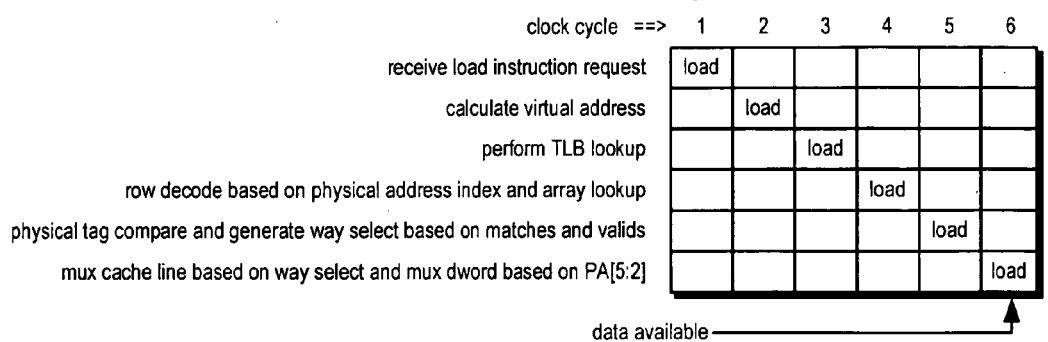
data available

Fast Pop Operation

Add to Stack Pointer Operation

# MICROPROCESSOR AND APPARATUS FOR PERFORMING FAST SPECULATIVE POP OPERATION FROM A STACK MEMORY CACHE

PRIORITY INFORMATION

This application claims priority based on U.S. Provisional Application, Ser. No. 60/440,767, filed Jan. 16, 2003, entitled FULLY ASSOCIATIVE STACK CACHE.

CROSS REFERENCE TO RELATED APPLICATIONS

This application is related to the following co-pending U.S. Patent Applications, which are filed on the same day as this application, and which have a common assignee and a common inventor.

| Serial Number | Docket Number | Title |
| --- | --- | --- |
| | CNTR.2229 | MICROPROCESSOR AND APPARATUS FOR PERFORMING SPECULATIVE LOAD OPERATION FROM A STACK MEMORY |
| | CNTR.2232 | MICROPROCESSOR WITH VARIABLE LATENCY STACK CACHE |
| | CNTR.2233 | MICROPROCESSOR AND APPARATUS FOR PERFORMING FAST POP OPERATION FROM RANDOM ACCESS CACHE MEMORY |

FIELD OF THE INVENTION

This invention relates in general to the field of cache memories in microprocessors and particularly to cache memories that distinguish between stack and non-stack memory accesses.

BACKGROUND OF THE INVENTION

A microprocessor is a digital device that executes instructions specified by a computer program. A typical computer system includes a microprocessor coupled to a system memory that stores program instructions and data to be processed by the program instructions. The performance of such a system is hindered by the fact that the time required to read data from the system memory into the microprocessor or to write data from the microprocessor to the system memory is typically much larger than the time required for the microprocessor to execute the instructions that process the data. The time difference is often between one and two orders of magnitude. Thus, the microprocessor may be sitting idle with nothing to do while waiting for the memory to be read or written.

However, processor designers recognized long ago that programs tend to access a relatively small proportion of the data a relatively large proportion of the time, such as frequently accessed program variables. Programs with this characteristic are said to display good temporal locality, and the propensity for this characteristic is referred to as the locality of reference principle. To take advantage of this principle, modern microprocessors typically include one or more cache memories. A cache memory, or cache, is a relatively small memory electrically close to the microprocessor core that temporarily stores a subset of data that normally resides in the larger, more distant memories of the computer system, such as the system memory. Caching data is storing data in a storage element of a cache memory so that the data can be subsequently more quickly provided from the cache memory than from a more distant memory of the system.

When the microprocessor executes a memory read instruction, such as a load or pop instruction, the microprocessor first checks to see if the requested data is present in the cache, i.e., if the memory read address hits in the cache. If not, i.e., if the memory read address misses in the cache, the microprocessor fetches the data into the cache in addition to loading it into the specified register of the microprocessor. Now since the data is present in the cache, the next time a memory read instruction is encountered that requests the same data, the data can be fetched from the cache into the register for processing, rather than from system memory. The memory read instruction can be executed essentially immediately since the data is already present in the cache.

A cache stores data in cache lines, or cache blocks. A cache line is the smallest unit of data than can be transferred between the cache and the system memory. An example of a cache line size is 64 bytes of data. When a memory read instruction causes a cache miss, an entire cache line implicated by the missing address is fetched into the cache, instead of only fetching the data requested by the memory read instruction. Consequently, subsequent memory read instructions that request data in the same cache line may be quickly executed because the data can be supplied from the cache rather than having to access system memory.

In addition, when a memory write instruction is executed, such as a store or push instruction, if the memory write address hits in the cache, the data may be immediately written into the cache line of the cache, thereby allowing the write of the data to system memory to be deferred. Later, the cache will write the cache line to system memory, typically in order to make room for a newer cache line. This operation is commonly referred to as a writeback operation. Still further, some caches also allocate an entry in the cache when a memory write address misses in the cache. That is, the cache performs a writeback operation of an old cache line in an entry of the cache, and reads the new cache line implicated by the write address from system memory into the cache entry formerly occupied by the old cache line. This operation is commonly referred to as a write allocate operation.

As may be observed, an efficiently performing cache may greatly improve the performance of the microprocessor. The two main factors affecting cache efficiency are the cache hit rate and the cache access time. The hit rate of a cache is the ratio of cache hits to the sum of cache hits and misses. The access time is the number of processor core clock cycles required for the specified data to be read from or written to the cache.

The largest factor affecting cache hit rate is the size of the cache, i.e., the number of data bytes that may be stored in the cache. The larger the cache, the larger the subset of system memory data stored in the cache, and hence the more likely the implicated cache line will be present in the cache. For this reason, there exists a motivation to increase the cache size. Historically, the size of the cache was typically limited by the amount of physical space on the microprocessor die that could be devoted to the cache. However, as circuit component geometries steadily decrease, this limitation has also diminished.

But, cache size also affects the access time of a conventional cache. Unfortunately, a larger cache typically has a longer access time than a smaller cache. This is because conventional cache memories are random access memories, i.e., the same amount of time is required to access any cache line in the cache. The greater the number of possible locations in which the data may be stored within the cache, the more complicated the circuitry required to locate the data specified by the memory address. Fortunately, the steady decrease in circuit component geometry sizes also reduces cache access time, and helps offset the negative effect of increased cache size.

However, there is a constant demand for higher microprocessor clock frequencies, which necessarily implies a reduction in clock cycle times, which implies a larger number of clock cycles to access a cache. Consequently, there is a trend toward smaller caches in microprocessors, particularly level-1 (L1) caches. For example, the Pentium4® L1 cache is only 8 KB—a reduction from the 16 KB L1 data cache in the Pentium III®. It is not chip real estate demands that compel the cache size reduction. Rather, it is the shorter processor core clock cycle times that compel cache size reductions, in spite of the accompanying performance reductions that smaller caches induce.

Therefore, what is needed is a way to increase the effective size of the cache or to reduce the cache access time or both.

SUMMARY

In one aspect, the present invention provides a cache memory that caches stack memory data distinctly from non-stack data, which is cached in another cache memory. The stack cache memory caches data in a last-in-first-out (LIFO) manner, as opposed to the random access manner of a conventional cache. Hence, the most recently pushed data that has not been subsequently popped is stored in the top entry of the stack cache. In one embodiment, the stack cache keeps track of the offset of the most recently pushed data within the cache line stored in the top entry. The stack cache takes advantage of the fact that typically pop instructions are correlated with previous push instructions to perform a speculative fast pop operation. Presuming the push/pop correlation, the stack cache speculatively provides the data specified by the offset in the cache line stored in the top stack cache entry immediately in response to a pop instruction without waiting to calculate the pop source address and without waiting to determine whether the source address hits in the stack cache. The pop source address is subsequently compared with the address of the cache line in the top stack cache entry to determine whether incorrect data was speculatively provided to the pop instruction. If so, action is taken to correct the condition and provide the correct data.

The offset is updated each time a pop or push instruction is encountered. If a pop instruction causes the offset to wrap to the next cache line, then the cache line in the top stack cache entry is popped off the stack cache after the pop data is provided. Conversely, if a push instruction causes the offset to wrap to the previous cache line, then the stack cache is shifted down one entry and the push data is stored in the new top entry. The cache line implicated by the push destination address is fetched and merged with the push data. Additionally, the offset is modified if an instruction is encountered that directly modifies the stack pointer, such as an instruction that adds a value to the stack pointer register. If the modification causes the offset to wrap to the next cache line, then the stack cache is popped accordingly.

The fast pop operation provides pop data potentially multiple clock cycles faster than a conventional cache. In particular, the time required to calculate the pop source address and the time required to translate the virtual pop source address into the physical pop source address are not included in the time to provide the speculative pop data. Additionally, the time required in a conventional cache to perform a row decode, tag compare, and way muxing are not included in the time required to provide the speculative pop data. Consequently, in at least one embodiment, the pop data is provided four clock cycles earlier than a conventional cache would provide the data.

BRIEF DESCRIPTION OF THE DRAWINGS

FIG. 10 is a timing diagram illustrating the timing of a fast pop operation of FIG. 5 from the stack cache of FIG. 1 according to the present invention.

FIG. 11 is a timing diagram illustrating the timing of a speculative load from the stack cache operation of FIG. 8 according to the present invention.

FIG. 12 is a timing diagram illustrating the timing of a normal, i.e., non-speculative, load from the stack cache operation of FIG. 8 according to the present invention.

FIG. 13 is a timing diagram illustrating the timing of a load from the non-stack cache operation of FIG. 8 according to the present invention.

DETAILED DESCRIPTION

Figure 1:
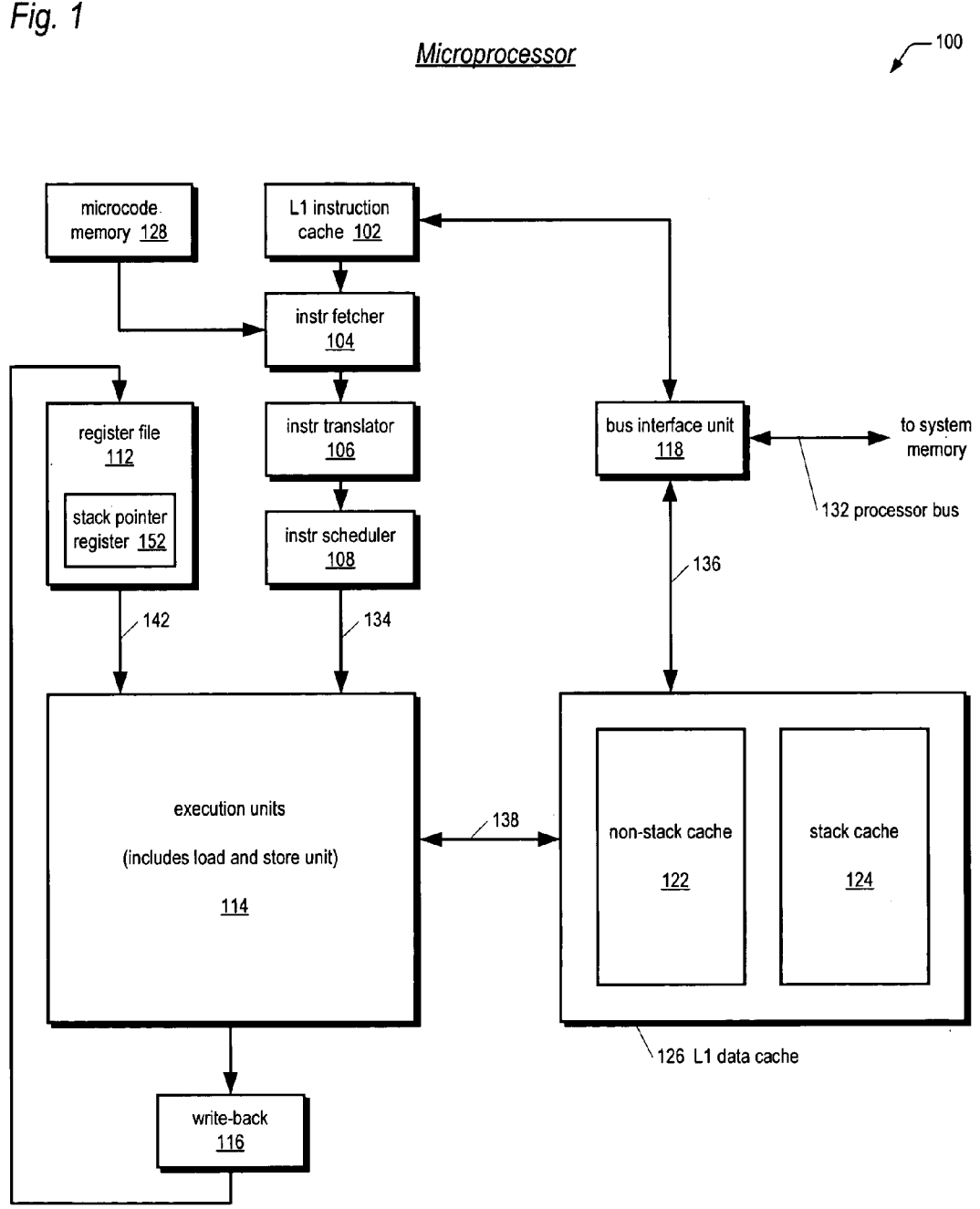
FIG. 1 is a block diagram of a pipelined microprocessor according to the present invention.

The present invention takes advantage of the fact that, broadly speaking, programs typically segregate system memory into two regions: a stack region and a non-stack region. The non-stack region is commonly referred to as the heap. A major difference between the stack and the heap is that the heap is accessed in a random access manner;

whereas, the stack is generally accessed in a last-in-first-out (LIFO) manner. Another distinction between the stack and the heap is the manner in which the instructions that read or write them specify the address of the location to be read or written. Instructions that read or write the heap generally specify the memory address explicitly. In contrast, instructions that read or write the stack generally specify the memory address implicitly via a special register in the microprocessor, commonly referred to as the stack pointer register. A push instruction updates the stack pointer register by the size of the data to be pushed onto the stack, and then stores the data from a register of the microprocessor to the address in memory stored in the updated stack pointer register. In the x86 architecture, for example, a push instruction (such as a PUSH, CALL, or ENTER instruction) decrements the stack pointer register by the size of the data to be pushed (for example, 4 bytes if the data is a dword), and then stores the data onto the stack at the address specified in the updated stack pointer register. Conversely, a pop instruction reads the data at the address stored in the stack pointer register, loads the data into a register in the microprocessor, and then updates the stack pointer register by the size of the data popped off the stack. In the x86 architecture, for example, a pop instruction (such as a POP, RET, or LEAVE instruction) increments the stack pointer register by the size of the data popped off the stack. Hence, by convention, according to its LIFO nature, the stack grows upward (i.e., in decreasing memory address) as data is pushed onto the stack, and correspondingly shrinks downward (i.e., in increasing memory address) as data is popped off the stack. Consequently, the value stored in the stack pointer register is referred to as the top of the stack.

A stack is a convenient mechanism for allocating memory space. One of the main uses of the stack in typical programs is to push subroutine parameters onto the stack along with the return address of the calling routine. The called subroutine returns to the calling routine by popping the return address off the stack into the microprocessor program counter, and the calling routine then pops the parameters off the stack to restore the stack to its pre-call condition. An extremely useful feature of this notion is that it facilitates nested subroutine calls.

The fast pop operations described herein take advantage of the fact that there is generally a one-to-one correspondence between push and pop instructions. That is, when a pop instruction is executed, the data popped off the stack is generally data that was previously pushed onto the stack by a corresponding push instruction.

In the present disclosure, a pop instruction is an instruction that moves data from memory into the microprocessor, such as into a register of the register file of the microprocessor, and the memory location of the data is implicitly specified rather than explicitly in the instruction. In particular, the pop data memory location address is implicitly based on a value stored in a stack pointer register of the microprocessor. Examples of pop instructions in an x86 architecture processor are POP, RET, and LEAVE instructions, whose source operand is implicitly specified relative to the stack pointer register value and whose destination operand specifies a register of the processor register file.

In the present disclosure, a load instruction is a non-pop instruction that moves data from memory into the microprocessor, such as into a register of the register file of the microprocessor. That is, the load instruction explicitly specifies the memory address of the source data, or at least explicitly specifies a register or set of registers that specify the memory address of the source data. An example of a load instruction in an x86 architecture processor is a MOV instruction whose source operand specifies a memory location and whose destination operand specifies a register of the processor register file.

In the present disclosure, a push instruction is an instruction that moves data to memory from the microprocessor, such as from a register of the register file of the microprocessor, and the memory location of the data is implicitly specified rather than explicitly in the instruction. In particular, the push data memory location address is implicitly based on a value stored in the stack pointer register of the microprocessor. Examples of push instructions in an x86 architecture processor are PUSH, CALL, and ENTER instructions, whose destination operand is implicitly specified relative to the stack pointer register value and whose source operand specifies a register of the processor register file.

In the present disclosure, a store instruction is a non-push instruction that moves data to memory from the microprocessor, such as from a register of the register file of the microprocessor to memory. That is, the store instruction explicitly specifies the memory address of the destination data, or at least explicitly specifies a register or set of registers that specify the memory address of the destination data. An example of a store instruction in an x86 architecture processor is a MOV instruction whose source operand specifies a register of the processor register file and whose destination operand specifies a memory location.

Referring now to FIG. 1, a block diagram of a pipelined microprocessor 100 according to the present invention is shown. In one embodiment, microprocessor 100 comprises a microprocessor whose instruction set conforms substantially to the x86 architecture instruction set. In particular, the instruction set includes an x86 POP, PUSH, CALL, RET, ENTER, and LEAVE instruction, among others. Additionally, the instruction set includes instructions that load data from memory and store data to memory, such as an x86 MOV instruction. However, the present invention is not limited to x86 architecture processors or to the x86 instruction set.

Microprocessor 100 includes a register file 112. Register file 112 comprises a plurality of registers for storing operands and state information of microprocessor 100. In one embodiment, register file 112 includes general purpose registers, address segment registers, index registers, status and control registers, and an instruction pointer, or program counter, register. In one embodiment, register file 112 comprises at least a user-visible register set of x86 architecture microprocessors. In particular, register file 112 includes a stack pointer register 152 that stores the address of the top of the stack in system memory. In one embodiment, stack pointer register 152 is substantially similar to the x86 ESP register.

Microprocessor 100 includes an instruction cache 102, for caching cache lines of instruction bytes. In one embodiment, instruction cache 102 comprises a level-1 (L1) cache. Instruction cache 102 caches instructions fetched from a system memory coupled to microprocessor 100, such as push and pop instructions. The push and pop instructions implicitly access a stack in system memory based on the top of stack address stored in stack pointer register 152.

Microprocessor 100 also includes a bus interface unit 118, coupled to instruction cache 102. Bus interface unit 118 is coupled to a processor bus 132, which couples microprocessor 100 to the system memory. Bus interface unit 118 interfaces various functional units within microprocessor 100 to the processor bus 132. For example, bus interface unit 118 fetches instructions from the system memory into instruction cache 102. Additionally, bus interface unit 118 reads data from and writes data to the system memory, such as the stack in the system memory whose top is specified by stack pointer register 152.

Microprocessor 100 also includes an instruction fetcher 104, coupled to instruction cache 102. Instruction fetcher 104 fetches instructions from instruction cache 102. Instruction fetcher 104 sequentially fetches the next instruction specified by the instruction pointer register in register file 112 unless it encounters a program control change event, such as a branch instruction, in which case instruction fetcher 104 begins fetching instructions at the target address of the branch instruction, or an exception, in which case instruction fetcher 104 begins fetching instructions of the exception handler routine for the particular exception.

Microprocessor 100 also includes a microcode memory 128, coupled to instruction fetcher 104. Microcode memory 128 stores instructions to be fetched by instruction fetcher 104. In particular, microcode memory 128 includes exception handler routine instructions for handling various exception conditions generated by microprocessor 100. In one embodiment, microprocessor 100 generates an exception to correct the state of microprocessor 100 with respect to stack accesses in response to detection of an incorrect speculative provision of pop or load data, as described below.

Microprocessor 100 also includes an instruction translator 106, coupled to instruction fetcher 104. Instruction translator 106 receives instructions from instruction fetcher 104, such as push and pop instructions, decodes the instructions, and translates the instructions into microinstructions for execution by the remainder of the microprocessor 100 pipeline. In one embodiment, the remainder of the microprocessor 100 pipeline comprises a RISC core that executes the microinstructions. In one embodiment, instruction translator 106 generates an indicator for each instruction to indicate whether the instruction from which the microinstruction is translated, referred to as a macroinstruction, is a push, pop, load, or store.

Microprocessor 100 also includes an instruction scheduler 108, coupled to instruction translator 106. Instruction scheduler 108 receives translated microinstructions from instruction translator 106 and issues the microinstructions 134 to execution units 114, which execute the microinstructions.

Execution units 114 receive microinstructions 134 from instruction scheduler 108 and operands 142, such as push instruction data or the value of stack pointer register 152, from register file 112 and execute the microinstructions 134. In one embodiment, execution units 114 include an integer unit, a floating point unit, an MMX unit, an SSE unit, a branch unit, a load unit, and a store unit. The load unit executes instructions that load data from the system memory into microprocessor 100, including pop instructions. The store unit executes store instructions, i.e., instructions that store data into the system memory from microprocessor 100, including push instructions.

Microprocessor 100 also includes a write-back stage 116, coupled to execution units 114. Write-back stage 116 receives the results of the instructions executed by execution units 114 and writes the results, such as pop instruction data, back to register file 112.

Microprocessor 100 also includes a data cache 126, coupled to bus interface unit 118 via bus 136 and to execution units 114 via bus 138. In one embodiment, data cache 126 is an L1 data cache. Data cache 126 includes a stack cache 124 and a non-stack cache 122. Bus interface unit 118 fetches data from the system memory into data cache 126 and writes data to the system memory from data cache 126. In particular, bus interface unit 118 writes back cache lines from stack cache 124 and non-stack cache 122 to system memory, and reads cache lines from system memory for writing into an allocated entry of stack cache 124 and non-stack cache 122. More particularly, bus interface unit 118 transfers data specified by push and pop instructions between the system memory stack and stack cache 124.

In one embodiment, non-stack cache 122 comprises substantially a conventional L1 data cache. That is, non-stack cache 122 comprises a conventional L1 data cache designed to facilitate uniform access times for a random distribution of system memory addresses. In one embodiment, non-stack cache 122 comprises a 4-way set associative cache. However, the store unit distinguishes between push and non-push instruction data in determining whether to store the data to stack cache 124 or to non-stack cache 122. The store unit stores push instruction data to stack cache 124 rather than non-stack cache 122, and stores non-push instruction data, i.e., store instruction data, to non-stack cache 122. In this respect, non-stack cache 122 is different from a conventional cache. Stack cache 124 is described in detail with respect to FIG. 2.

In one embodiment, microprocessor 100 also includes a level-2 (L2) cache that backs the L1 instruction cache 102 and the L1 data cache 126. In particular, the L2 cache serves as a victim cache for cache lines evicted from the data cache 126 (both the non-stack cache 122 and stack cache 124), and the L1 data cache 126 fills cache lines from the L2 cache.

Figure 2:
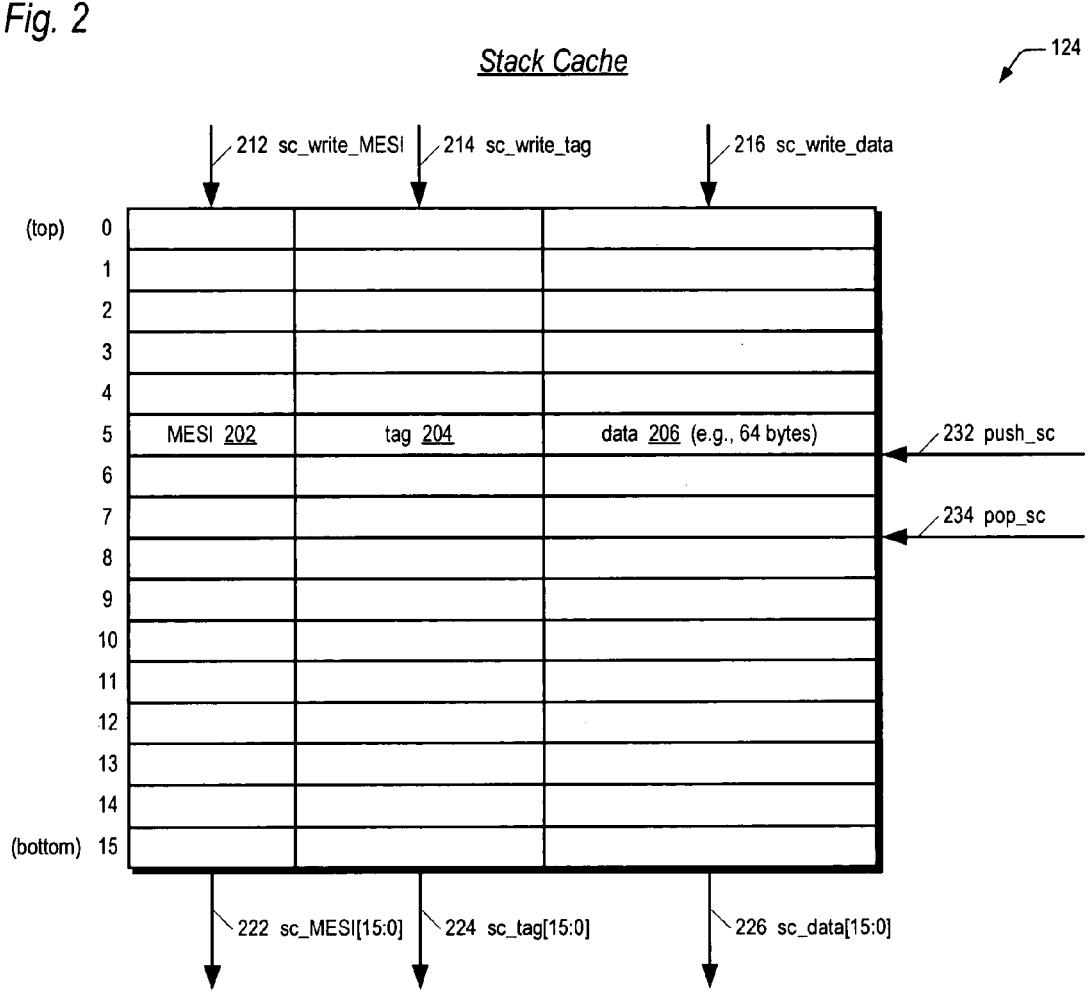
FIG. 2 is a block diagram illustrating the stack cache of FIG. 1 according to the present invention.

Referring now to FIG. 2, a block diagram illustrating the stack cache 124 of FIG. 1 according to the present invention is shown. Stack cache 124 includes a plurality of storage elements configured as a stack, or LIFO memory. The fact that the stack cache 124 is a stack or LIFO memory is not to be confused with the stack comprised in the system memory, whose top is specified by the value in the stack pointer register 152. Rather, stack cache 124 caches data of the system memory stack.

The embodiment of FIG. 2 includes sixteen storage elements, or entries, designated as 0 through 15. The top entry is designated as entry 0 and the bottom entry is designated as entry 15. However, the present invention is not limited to a particular number of entries in stack cache 124. Each entry includes storage space for a cache line of data 206, an address tag 204 of the cache line 206, and a cache status 202 of the cache line 206. In one embodiment, the cache status 202 comprises status conforming substantially to the well-known MESI (Modified, Exclusive, Shared, Invalid) cache coherency state values. In one embodiment, a cache line 206 comprises 64 bytes of data. In one embodiment, tag 204 comprises a physical address of the cache line 206.

In one embodiment, the tag 204 includes the upper significant bits of the cache line 206 physical address required to uniquely identify the cache line 206. In one embodiment, microprocessor 100 includes a memory paging system that translates virtual memory addresses into physical memory addresses, and the tag 204 also includes a virtual address of the cache line 206. In one embodiment, the virtual address comprises a hash of the virtual address bits, in order to reduce the amount of space required for storing the virtual address. Use of the virtual address portion of the tag 204 to perform speculative loads from stack cache 124 is described in detail below.

Stack cache 124 receives new cache status for storing into MESI field 202 of the top entry via sc_write_MESI signal 212. Stack cache 124 receives a new tag for storing into tag field 204 of the top entry via sc_write_tag signal 214. Stack cache 124 receives a new cache line for storing into data field 206 of the top entry via sc_write_data signal 216. Stack cache 124 also receives a push_sc signal 232 from control logic 302 of FIG. 3. When control logic 302 asserts a true value on push_sc signal 232, stack cache 124 is shifted down one entry, i.e., the bottom entry is shifted out of stack cache 124 and each of the other entries receives the value of the entry immediately above them, and the values on sc_write_MESI 212, sc_write_tag 214, and sc_write_data 216 are written into the top entry of stack cache 124. In one embodiment, each dword of a cache line 206 of stack cache 124 may be individually written via sc_write_data signal 216. In one embodiment, a dword (or double-word) comprises four bytes. Other embodiments are contemplated in which each word (2 bytes), or each byte of a cache line 206 of stack cache 124 may be individually written via sc_write_data signal 216.

Stack cache 124 provides the MESI state 202 of each of its sixteen entries on an sc_MESI[15:0] signal 222. Stack cache 124 provides the tag 204 of each of its sixteen entries on an sc_tag[15:0] signal 224. Stack cache 124 provides the cache line data 206 of each of its sixteen entries on an sc_data[15:0] signal 226. The cache line 206 of the top entry is provided on sc_data[0], the cache line 206 of the next to top entry is provided on sc_data[1], and so forth down to the cache line 206 of the bottom entry is provided on sc_data[15]. The tag 204 and MESI state 202 are similarly provided. Stack cache 124 also receives a pop_sc signal 234 from control logic 302 of FIG. 3. When control logic 302 asserts a true value on pop_sc signal 234, stack cache 124 is shifted up one entry, i.e., the top entry is shifted out of stack cache 124, and each of the other entries receives the values of the entry immediately below them. In one embodiment, when an entry is popped from stack cache 124, i.e., when pop_sc signal 234 is true, the MESI state 202 of the bottom entry of stack cache 124 is updated to a value of Invalid. The MESI state 202 of all entries of stack cache 124 are initialized to a value of Invalid.

Figure 3:
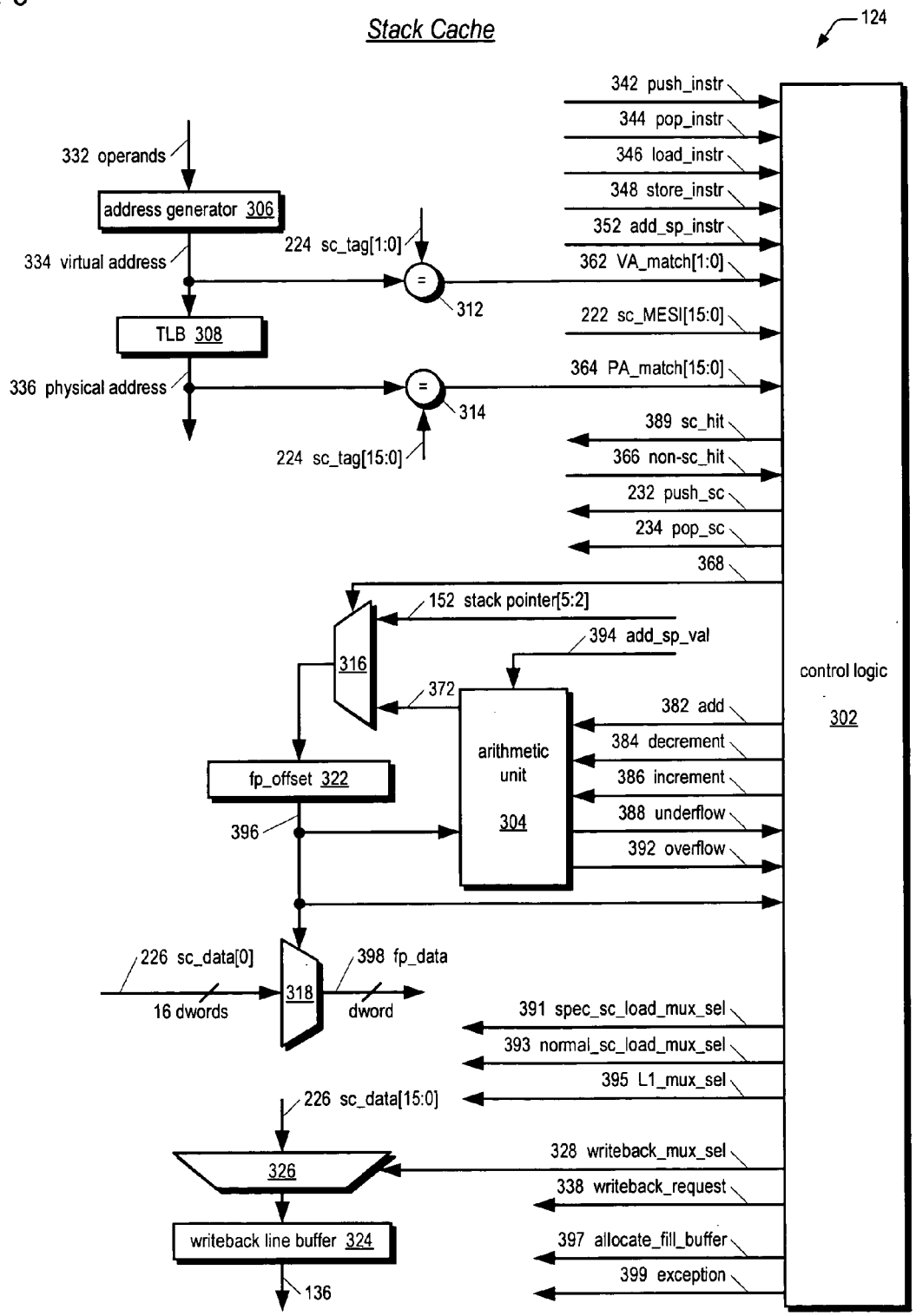
FIG. 3 is a block diagram of additional elements of the stack cache of FIG. 1 according to the present invention.

Referring now to FIG. 3, a block diagram of additional elements of stack cache 124 of FIG. 1 according to the present invention is shown. Stack cache 124 includes control logic 302.

Control logic 302 receives a push_instr signal 342 from the store unit of execution units 114 of FIG. 1. A true value on push_instr signal 342 indicates that the store unit is requesting to store data into data cache 126 of FIG. 1 in response to a push instruction received from instruction scheduler 108 of FIG. 1.

Control logic 302 also receives a pop_instr signal 344 from the load unit of execution units 114. A true value on pop_instr signal 344 indicates that the load unit is requesting to load data from data cache 126 in response to a pop instruction received from instruction scheduler 108.

Control logic 302 also receives a load_instr signal 346 from the load unit of execution units 114. A true value on load_instr signal 346 indicates that the load unit is requesting to load data from data cache 126 in response to a load instruction received from instruction scheduler 108.

Control logic 302 also receives a store_instr signal 348 from the store unit of execution units 114. A true value on store_instr signal 348 indicates that the store unit is requesting to store data to data cache 126 in response to a store instruction received from instruction scheduler 108.

Control logic 302 also receives an add_sp_instr signal 352 from the integer unit of execution units 114. A true value on add_sp_instr signal 352 indicates that the integer unit is notifying data cache 126 that an add to the stack pointer instruction was received from instruction scheduler 108, such as an x86 ADD instruction. In one embodiment, the add macroinstruction is adding an immediate value to the stack pointer register, such as an ADD ESP,imm instruction.

Stack cache 124 also includes an address generator 306. Address generator 306 receives operands from register file 112 of FIG. 1, such as base values, offsets, and memory descriptor values, and generates a virtual address 334 based on the values received. The virtual address 334 is a virtual memory address of an instruction that accesses memory, such as a push, pop, load, or store instruction. In the case of a load instruction, virtual address 334 is the virtual source address of the load data. In the case of a store instruction, virtual address 334 is the virtual destination address of the store data. In the case of a pop instruction, virtual address 334 is the virtual source address of the pop data. In the case of a push instruction, virtual address 334 is the virtual destination address of the push data. In one embodiment, address generator 306 is comprised in each of the load and store units.

Stack cache 124 also includes a translation look-aside buffer (TLB) 308, coupled to address generator 306. TLB 308 caches page table information used to translate virtual address 334 into a physical address 336. In one embodiment, only an upper portion of physical address 336 is translated by TLB 308, and the lower portion of physical address 336 is simply the corresponding lower portion of virtual address 334. In one embodiment, a minimum page size of 4 KB; hence, the lower 12 address bits of physical address 336 are not translated.

Stack cache 124 also includes two comparators 312, coupled to address generator 306. The comparators 312 each receive virtual address 334. One of the comparators 312 receives the virtual address portion of sc_tag[0] signal 224 of FIG. 2, and the other comparator 312 receives the virtual address portion of sc_tag[1] signal 224. That is, the two comparators 312 receive the respective virtual address portion of tag 204 of FIG. 2 of the top two entries of stack cache 124 and compare the respective virtual sc_tag 224 with virtual address 334. If virtual sc_tag[0] 224 matches virtual address 334, then the first comparator 312 generates a true value on a VA_match[0] signal 362, which is provided to control logic 302. Similarly, if virtual sc_tag[1] 224 matches virtual address 334, then the second comparator 312 generates a true value on a VA_match[1] signal 362, which is also provided to control logic 302. Control logic 302 also receives sc_MESI[15:0] signals 222 of FIG. 2 from stack cache 124. Control logic 302 uses the VA_match[1:0] signals 362 and the sc_MESI[1:0] signals 222 to determine whether virtual address 334 hits in either of the top two entries of stack cache 124 in order to perform speculative loads from stack cache 124, as described in detail below. That is, control logic 302 uses the VA_match[1:0] signals 362 and the sc_MESI[1:0] signals 222 to determine whether virtual address 334 matches a valid one of the virtual address portion of either of virtual sc_tag[1:0] 224. In the embodiment in which the virtual tag 204 is a hash of the virtual address bits, virtual address 334 is hashed before being provided to comparators 312.

It is noted that although an embodiment of FIG. 3 is described in which the top two entries of stack cache 124 are checked to determine whether a speculative load may be performed therefrom, other embodiments are contemplated in which more than the two top entries are checked, and another embodiment is contemplated in which only the top entry is checked. The greater the amount of data items implicated by the check, the greater the likelihood of detecting the ability to perform a fast load. Consequently, the greater the cache line size, the fewer the number of entries that need to be checked. The embodiment of FIG. 3 provides checking for 128 bytes.

Stack cache 124 also includes sixteen comparators 314, coupled to TLB 308. The comparators 314 each receive physical address 336. Comparators 314 also each receive a respective one of sc_tag[15:0] signal 224. That is, comparators 314 receive the respective physical address portion of tag 204 on respective sc_tag signal 224 and compare it with physical address 336. If physical sc_tag[0] 224 matches physical address 336, then the first comparator 314 generates a true value on a PA_match[0] signal 364, which is provided to control logic 302; if physical sc_tag[1] 224 matches physical address 336, then the second comparator 314 generates a true value on a PA_match[1] signal 364, which is also provided to control logic 302; and so forth for each of the sixteen comparators 314. Control logic 302 uses the PA_match[15:0] signals 364 and the sc_MESI[15:0] signals 222 to determine whether physical address 336 hits in any of the entries of stack cache 124 in order to perform loads from stack cache 124 and to determine whether speculative pops or loads correctly or incorrectly speculatively provided their data, as described in detail below. That is, control logic 302 uses the PA_match[15:0] signals 364 and the sc_MESI[15:0] signals 222 to determine whether physical address 336 matches a valid one of the physical address portion of sc_tag[15:0] 224.

Control logic 302 also generates a sc_hit signal 389, which is provided to the load and store units of execution units 114, to indicate that the cache line implicated by a pop, push, load, or store instruction is at least speculatively present in stack cache 124. In the case of a pop instruction, control logic 302 speculatively generates a true value on sc_hit signal 389 in response to a true value on pop_instr signal 344 before verifying that the pop source address hits in the stack cache 124, as described below with respect to FIG. 5. In the case of a push instruction, control logic 302 generates a true value on sc_hit signal 389 if sc_MESI[15:0] 222 and PA_match[15:0] 364 indicate that physical address 336 matches a valid physical address tag in stack cache 124 or if stack cache 124 allocates the cache line implicated by physical address 336, as described below with respect to FIG. 6. In the case of a load instruction, control logic 302 speculatively generates a true value on sc_hit signal 389 if sc_MESI[1:0] 222 and VA_match[1:0] 362 indicate that virtual address 334 matches a valid virtual address tag in one of the top entries of stack cache 124 or non-speculatively generates a true value on sc_hit signal 389 if sc_MESI[15:0] 222 and PA_match[15:0] 364 indicate that physical address 336 matches a valid physical address tag in stack cache 124, as described below with respect to FIG. 8. In the case of a store instruction, control logic 302 generates a true value on sc_hit signal 389 if sc_MESI[15:0] 222 and PA_match[15:0] 364 indicate that physical address 336 matches a valid physical address tag in stack cache 124, as described below with respect to FIG. 9.

Control logic 302 also receives a non-sc_hit signal 366 from non-stack cache 122 of FIG. 1. The non-sc_hit signal 366 is true if physical address 336 hits in non-stack cache 122. Control logic 302 also generates push_sc signal 232 and pop_sc signal 234 of FIG. 2, whose operation is described herein.

Stack cache 124 also includes an fp_offset register 322, coupled to control logic 302, for storing a value referred to as fp_offset. Register 322 outputs its value on an fp_offset signal 396, which is provided to control logic 302. The fp_offset 322 value is used to perform a fast pop operation from stack cache 124, as described in detail below. As will be understood from study of the remaining Figures below, and in particular of the flowcharts of FIGS. 5 through 7, fp_offset 322 specifies the location within the cache line stored in the top entry of stack cache 124 of the data specified by the most recent push instruction. That is, fp_offset 322 specifies the location of the data of a push instruction that has not yet been popped off the stack in main memory. In one embodiment, fp_offset 322 comprises a four-bit value for specifying an offset of one of sixteen dwords in the cache line 206 stored in the top entry of stack cache 124. Control logic 302 monitors pop, push, and add to stack pointer instructions to anticipate changes to the stack pointer register 152 and to keep the fp_offset 322 value consistent with bits [5:2] of stack pointer register 152. In one embodiment, control logic 302 updates fp_offset 322 when the load, store, or integer unit of execution units 114 indicate that a pop, push, or add to stack pointer instruction, respectively, has been issued. In one embodiment, control logic 302 updates fp_offset 322 without waiting for the stack pointer register 152 to be updated by write-back stage 116. By doing this, a pop instruction subsequent to a push, add to stack pointer, or other pop instruction may use the anticipated value of the stack pointer 152 without having to stall waiting for write-back stage 116 to update the stack pointer 152 and then obtain bits [5:2] from stack pointer register 152.

Stack cache 124 also includes a sixteen-input multiplexer 318, coupled to fp_offset register 322. In one embodiment, multiplexer 318 includes sixteen inputs, each for receiving a respective one of the sixteen dwords of sc_data[0] signal 226. Multiplexer 318 receives fp_offset signal 396 as a select input to select one of the sixteen dwords of sc_data[0] to output on a fp_data 398 signal for provision to a pop instruction when performing a fast pop operation, as described below.

Stack cache 124 also includes an arithmetic unit 304, coupled to control logic 302. Arithmetic unit 304 receives fp_offset signal 396.

Arithmetic unit 304 also receives a decrement signal 384 from control logic 302. If control logic 302 generates a true value on decrement signal 384, arithmetic unit 304 decrements the value received on fp_offset signal 396 and provides the decremented value on an output 372. If the decrement operation results in an underflow, arithmetic unit 304 generates a true value on an underflow signal 388, which is provided to control logic 302.

Arithmetic unit 304 also receives an increment signal 386 from control logic 302. If control logic 302 generates a true value on increment signal 386, arithmetic unit 304 increments the value received on fp_offset signal 396 and provides the incremented value on output 372. If the increment operation results in an overflow, arithmetic unit 304 generates a true value on an overflow signal 392, which is provided to control logic 302.

Arithmetic unit 304 also receives an add signal 382 from control logic 302. If control logic 302 generates a true value on add signal 382, arithmetic unit 304 adds the value received on fp_offset signal 396 to the value received on an add_sp_val signal 394 and provides the sum on output 372. If the addition results in an overflow, arithmetic unit 304 generates a true value on overflow signal 392. In one embodiment, the add_sp_val signal 394 is provided by the integer unit of the execution units 114 of FIG. 1. The value provided on add_sp_val signal 394 is the value specified by an instruction that adds a value to the stack pointer 152.

Stack cache 124 also includes a two-input multiplexer 316, coupled to fp_offset register 322. The output of multiplexer 316 is coupled to the input of fp_offset register 322. Multiplexer 316 receives output 372 of arithmetic unit 304 on one input. Multiplexer 316 receives bits [5:2] of the output of stack pointer register 152 on its other input. Multiplexer 316 receives a control signal 368 from control logic 302 as a select input to select one of its inputs for outputting to fp_offset register 322.

Stack cache 124 also includes a sixteen-input multiplexer 326, coupled to control logic 302. Each of the sixteen inputs of multiplexer 326 receives a respective one of the sixteen cache lines 206 of stack cache 124 provided on the sixteen respective sc_data[15:0] signals 226. Multiplexer 326 selects one of the sixteen sc_data[15:0] signals 226 specified by a writeback_mux_sel signal 328 generated by control logic 302. The output of multiplexer 326 is provided as the input to a writeback line buffer 324. The output of writeback line buffer 324 is provided on bus 136 to bus interface unit 118 of FIG. 1. Control logic 302 also generates a writeback_request signal 338, which is also provided to bus interface unit 118. Writeback line buffer 324 and writeback_request signal 338 are used to writeback a cache line from stack cache 124 to system memory, as described below.

Control logic 302 also generates a true value on an allocate_fill_buffer signal 397 to allocate a fill buffer for fetching a cache line into system memory or from another cache memory in microprocessor 100, such as stack cache 124 or an L2 cache, as described below.

Control logic 302 also generates a true value on an exception signal 399 to indicate that an exception condition has occurred to cause microprocessor 100 to branch to an exception handler in microcode memory 128, as described below.

Control logic 302 also generates a spec_sc_load_mux_sel signal 391, a normal_sc_load_mux_sel signal 393, and an L1_mux_sel signal 395, all of which are described below, particularly with respect to FIG. 4.

Figure 4:
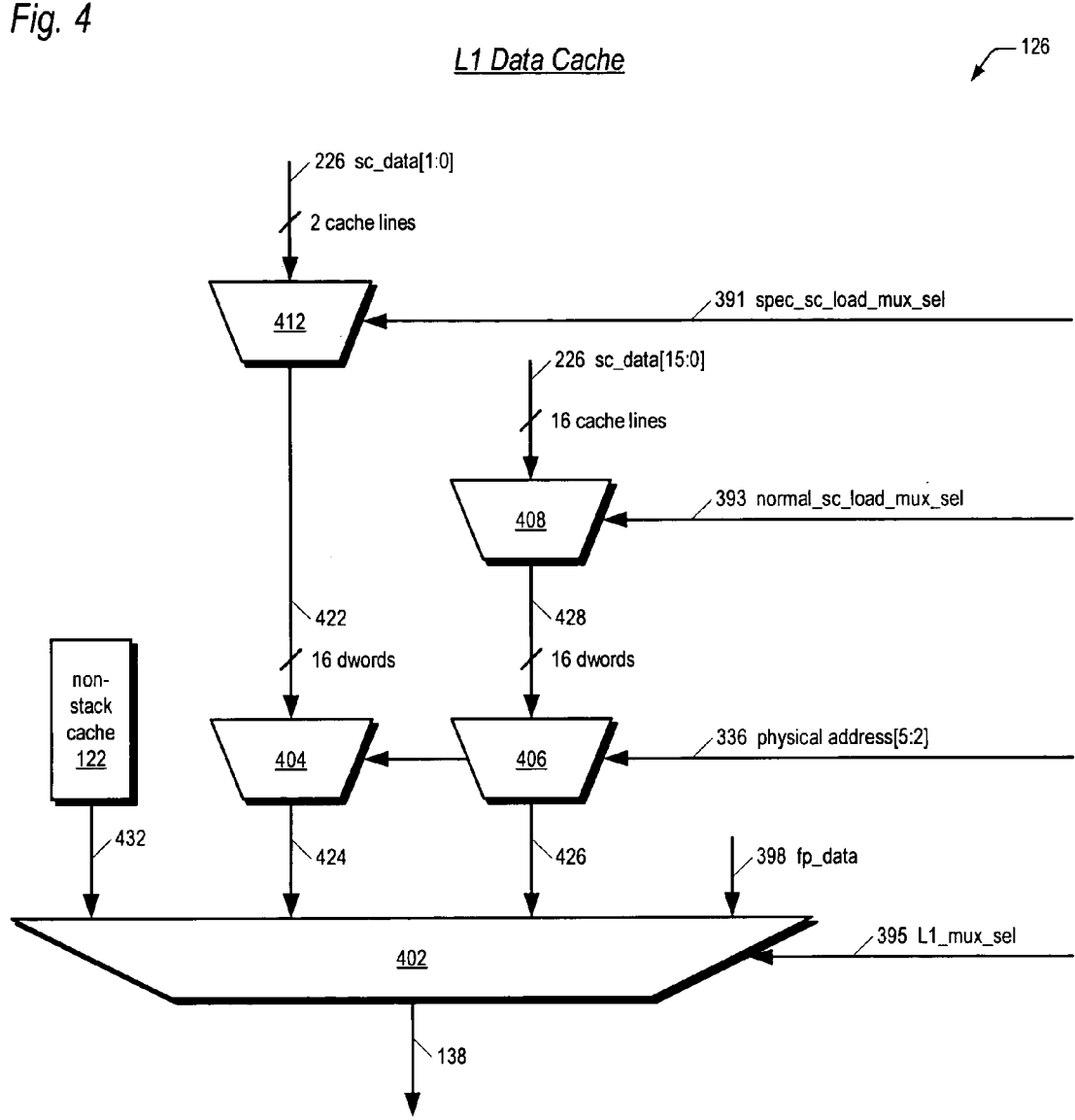
FIG. 4 is a block diagram illustrating muxing logic of the L1 data cache of FIG. 1 according to the present invention.

Referring now to FIG. 4, a block diagram illustrating muxing logic of L1 data cache 126 of FIG. 1 according to the present invention is shown. Data cache 126 includes a four-input multiplexer 402, whose output is provided on bus 138 of FIG. 1. In particular, multiplexer 402 provides pop and load data on its output 138 to the load unit in execution units 114 of FIG. 1.

The first input of multiplexer 402 receives output data 432 from non-stack cache 122 of FIG. 1 to provide data for a load from non-stack cache 122. The second input of multiplexer 402 receives the output 424 of a sixteen-input multiplexer 404 to provide data for a speculative load from stack cache 124. The third input of multiplexer 402 receives the output 426 of a second sixteen-input multiplexer 406 to provide data for a normal, or non-speculative, load from stack cache 124. The fourth input of multiplexer 402 receives fp_data signal 398 of FIG. 3 to provide data for a fast pop operation.

Multiplexer 404 receives the sixteen dwords of a cache line 422 from the output of a two-input multiplexer 412. Multiplexer 404 selects one of the sixteen dwords of cache line 422 based on a select input which is bits [5:2] of physical address 336 of FIG. 3.

Multiplexer 406 receives the sixteen dwords of a cache line 428 from the output of a sixteen-input multiplexer 408. Multiplexer 406 selects one of the sixteen dwords of cache line 428 based on a select input which is bits [5:2] of physical address 336.

The two inputs of multiplexer 412 receive the cache lines of the top two entries of stack cache 124 via sc_data[1:0] signal 226. Multiplexer 412 selects one of the two cache lines sc_data[1:0] 226 for output on signal 422 based on spec_sc_load_mux_sel signal 391 of FIG. 3, which control logic 302 generates based on the values of load_instr signal 346, VA_match[1:0] signal 362, and sc_MESI[1:0] signal 222, as described below.

Multiplexer 408 receives on respective ones of its sixteen inputs the cache lines of the sixteen entries of stack cache 124 via sc_data[15:0] signal 226. Multiplexer 408 selects one of the sixteen cache lines sc_data[15:0] 226 for output on signal 428 based on normal_sc_load_mux_sel signal 393 of FIG. 3, which control logic 302 generates based on the values of load_instr signal 346, PA_match[15:0] signal 364, and sc_MESI[15:0] signal 222, as described below.

Figure 5:
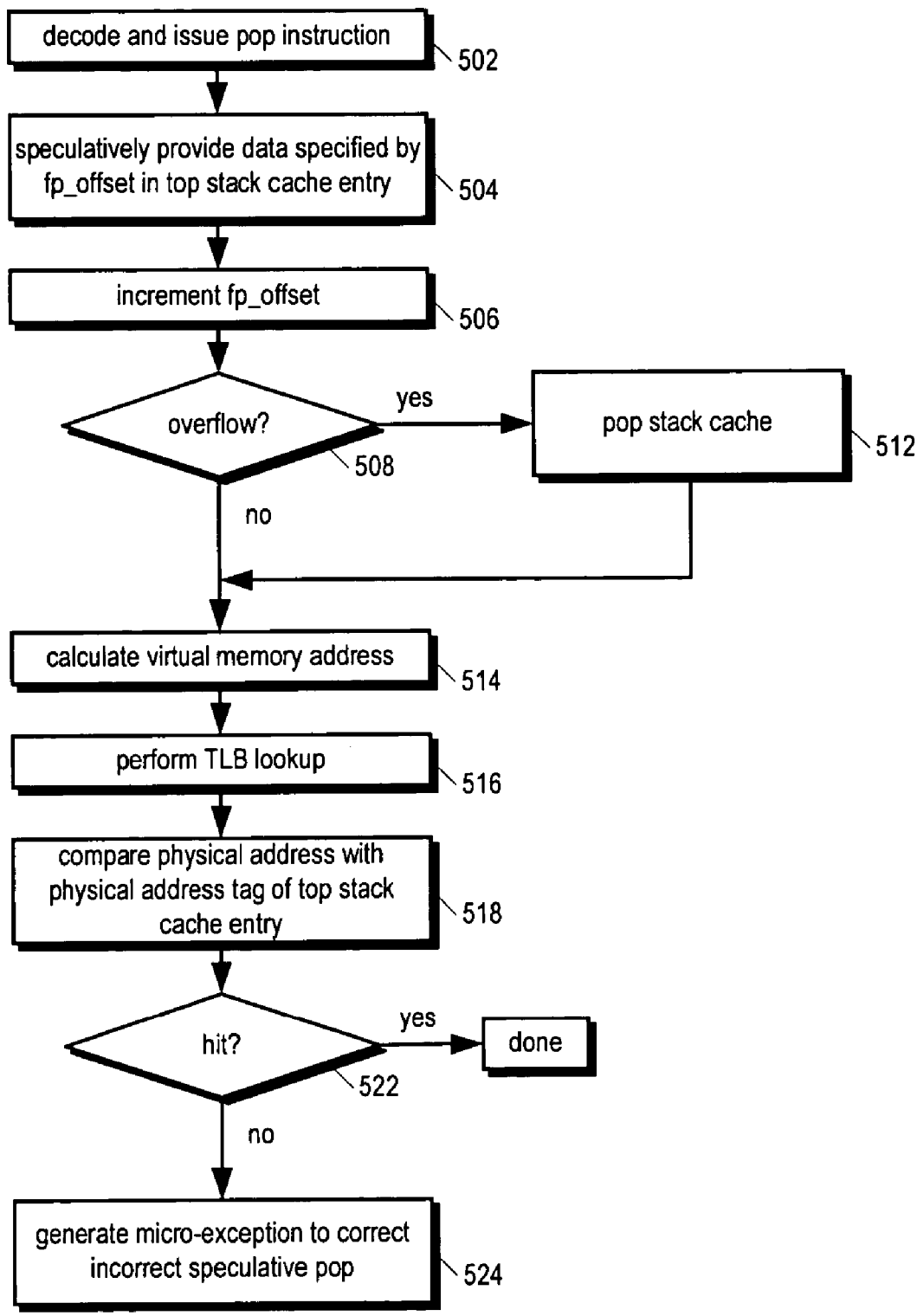
FIG. 5 is a flowchart illustrating a fast pop operation from the stack cache of FIG. 1 according to the present invention.

Referring now to FIG. 5, a flowchart illustrating a fast pop operation from stack cache 124 of FIG. 1 according to the present invention is shown. Flow begins at block 502.

At block 502, instruction translator 106 of FIG. 1 decodes a pop instruction and instruction scheduler 108 of FIG. 1 issues the pop instruction to the load unit of execution units 114 of FIG. 1. In response, the load unit generates a true value on pop_instr signal 344 of FIG. 3. Flow proceeds to block 504.

At block 504, multiplexer 318 selects the appropriate dword from the cache line sc_data[0] 226 in the top entry of stack cache 124 for provision on fp_data signal 398 based on the value currently stored in fp_offset register 322 of FIG. 3. In response to the true value on pop_instr signal 344, control logic 302 of FIG. 3 generates a value on L1_mux_sel signal 395 of FIG. 3 to cause multiplexer 402 of FIG. 4 to select the fp_data input 398 of FIG. 3 for provision on bus 138 to the load unit of execution units 114 for provision to the pop instruction, which write-back stage 116 subsequently loads into one of the registers of register file 112 of FIG. 1 specified in the pop instruction. For example, if the pop instruction is an x86 RET instruction, then the pop data is loaded into the instruction pointer register of register file 112. For example, if the pop instruction is an x86 LEAVE instruction, then the pop data is loaded into the x86 EBP of register file 112. For example, if the pop instruction is an x86 POP instruction, then the pop data is loaded into the register of register file 112 specified in the POP instruction. As may be observed from FIG. 5, the data is provided to the load unit speculatively. The operation is speculative because it has not yet been verified that the source address of the pop instruction, which will be subsequently generated on physical address 336 at block 516, is the same as the address of the pop data provided from the top entry of stack cache 124 to the load unit. Also in response to the true value on pop_instr signal 344, control logic 302 generates a true value on sc_hit signal 389 of FIG. 3, which is provided to the load unit of execution units 114. Flow proceeds to block 506.

At block 506, control logic 302 generates a true value on increment signal 386, and arithmetic unit 304 responsively increments fp_offset 396 and provides the incremented value on output 372, which control logic 302 causes multiplexer 316 to select via control signal 368 for loading into fp_offset register 322 of FIG. 3. Flow proceeds to decision block 508.

At decision block 508, control logic 302 examines overflow signal 392 to determine whether the increment operation performed at block 506 caused an overflow of fp_offset 322. That is, control logic 302 determines whether the pop instruction will cause the stack pointer 152 to wrap to the next cache line. If so, flow proceeds to block 512; otherwise, flow proceeds to block 514.

At block 512, control logic 302 generates a true value on pop_sc signal 234 to pop the top entry off stack cache 124. The top entry is popped off stack cache 124 to keep the stack cache 124 consistent with the system memory cache, since the last dword in the cache line stored in the top entry is now being popped off the system memory stack by the pop instruction. In one embodiment, block 512 is not performed until block 518, described below, has been performed so that the physical address 336 may be compared with the sc_tag [0] 224 value of the entry from which the data was provided during block 504. In one embodiment, the sc_tag[0] 224 value used at block 504 is saved for subsequent use at block 518. Although an embodiment is described in which fp_offset 322 is maintained as a dword offset to accommodate dword push and pop instructions, other embodiments are contemplated that accommodate other push and pop data sizes, such as words, bytes, or quad-words. Flow proceeds to block 514.

At block 514, address generator 306 calculates the source virtual address 334 of FIG. 3 of the pop instruction. Flow proceeds to block 516.

At block 516, TLB 308 generates the source physical address 336 of FIG. 3 of the pop instruction. Flow proceeds to block 518.

At block 518, one of the comparators 314 of FIG. 3 compares the physical address 336 generated at block 516 with the physical sc_tag[0] 224 of FIG. 2 to generate PA_match[0] signal 364 of FIG. 3. Flow proceeds to decision block 522.

At decision block 522, control logic 302 examines sc_MESI[0] signal 222 of FIG. 2 and PA_match[0] signal 364 to determine whether the top entry of stack cache 124 is valid and whether the source physical address 336 of the pop instruction matches the physical tag 204 of the top stack cache 124 entry, i.e., whether physical address 336 hits in the top entry of stack cache 124. In one embodiment, bits [5:2] of physical address 336 are also compared with the value of fp_offset 396 that was used to select the dword provided on fp_data 398 to verify that the correct dword was provided. If the pop instruction source address 336 hits in the top entry of stack cache 124, flow ends, i.e., the speculative fast pop operation provided the correct pop data. Otherwise, flow proceeds to block 524.

At block 524, control logic 302 generates a true value on exception signal 399 to cause microprocessor 100 to branch to an exception handler for handling the condition in which the speculative fast pop operation provided the incorrect pop data. In one embodiment, the exception handler flushes stack cache 124 and loads the current value of bits [5:2] of the stack pointer register 152 into fp_offset register 322. The exception handler causes the correct data to be provided to the pop instruction. In one embodiment, flushing stack cache 124 includes writing back to system memory or an L2 cache any valid cache lines in stack cache 124 to system memory. Flow ends at block 524.

As may be observed, and as will be discussed in more detail below with respect to FIG. 10, the fast pop operation described with respect to FIG. 5 enables pop data to be provided to a pop instruction potentially multiple clock cycles faster than with a conventional cache memory that makes no distinction between pop instructions and load instructions.

Figure 6:
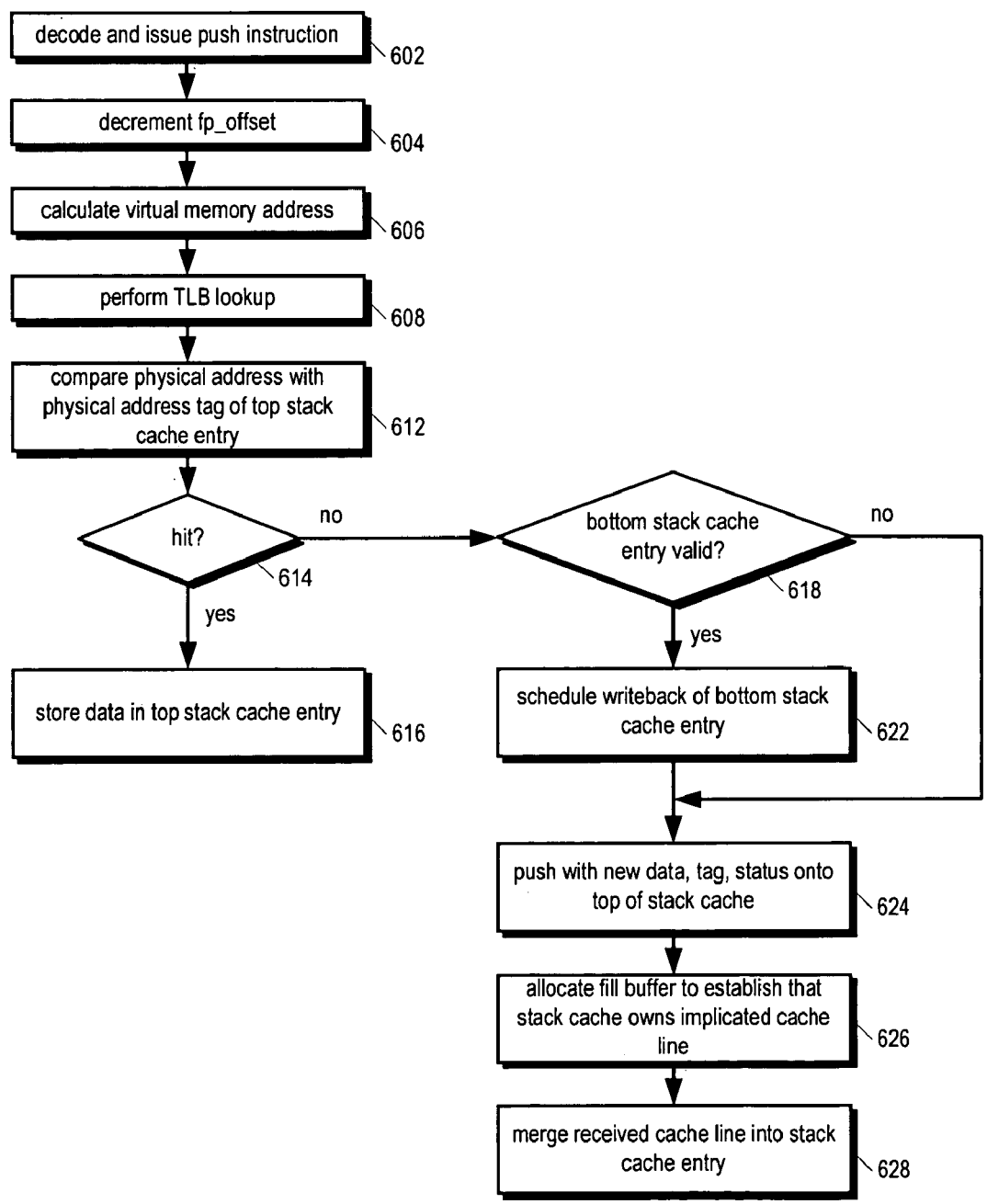
FIG. 6 is a flowchart illustrating a push operation to the stack cache of FIG. 1 according to the present invention.

Referring now to FIG. 6, a flowchart illustrating a push operation to the stack cache 124 of FIG. 1 according to the present invention is shown. Flow begins at block 602.

At block 602, instruction translator 106 of FIG. 1 decodes a push instruction and instruction scheduler 108 of FIG. 1 issues the push instruction to the store unit of execution units 114 of FIG. 1. In response, store unit generates a true value on push_instr signal 342 of FIG. 3. Flow proceeds to block 604.

At block 604, control logic 302 generates a true value on decrement signal 384, and arithmetic unit 304 responsively decrements fp_offset 396 and provides the decremented value on output 372, which control logic 302 causes multiplexer 316 to select via control signal 368 for loading into fp_offset register 322 of FIG. 3. Additionally, in response to a true value on push_instr signal 342, control logic 302 generates a true value on sc_hit signal 389, which is provided to the store unit of execution units 114. Flow proceeds to block 606.

At block 606, address generator 306 calculates the destination virtual address 334 of FIG. 3 of the push instruction. Flow proceeds to block 608.

At block 608, TLB 308 generates the destination physical address 336 of FIG. 3 of the push instruction. Flow proceeds to block 612.

At block 612, one of the comparators 314 of FIG. 3 compares the physical address 336 generated at block 516 with the physical sc_tag[0] 224 of FIG. 2 to generate PA_match[0] signal 364 of FIG. 3. Flow proceeds to decision block 614.

At decision block 614, control logic 302 examines sc_MESI[0] signal 222 of FIG. 2 and PA_match[0] signal 364 to determine whether the top entry of stack cache 124 is valid and whether the destination physical address 336 of the push instruction matches the physical tag 204 of the top stack cache 124 entry, i.e., whether physical address 336 hits in the top entry of stack cache 124. If so, flow proceeds to block 616. Otherwise, flow proceeds to decision block 618. In one embodiment, if physical address 336 hits in an entry of stack cache 124 other then the top entry, then the stack cache 124 is flushed after valid entries are written back to system memory and then flow proceeds to block 616.

At block 616, the push data is stored into the top entry of stack cache 124 via sc_write_data signal 216 into the dword offset of the cache line 206 indicated by address bits [5:2] of physical address 336. If necessary, the MESI state 202 of the top entry is updated via sc_write_MESI signal 212, such as to a value of Modified. The push data is obtained from the register of register file 112 specified by the push instruction. For example, if the push instruction is an x86 CALL instruction, then the push data is the next sequential instruction pointer calculated from the instruction pointer register of register file 112. For example, if the push instruction is an x86 ENTER instruction, then the push data is the value in the x86 EBP register of register file 112. For example, if the push instruction is an x86 PUSH instruction, then the push data is the register of register file 112 specified in the PUSH instruction. Flow ends at block 616.

At decision block 618, since the push data destination address 336 missed in stack cache 124, a new entry, namely the top entry, in stack cache 124 must be allocated for the cache line implicated by the push destination address 336. Since stack cache 124 will be shifted down to allocate the top entry for the new cache line, the bottom entry will necessarily be shifted out of stack cache 124. Therefore, control logic 302 examines sc_MESI[15] 222 to determine whether the bottom stack cache 124 entry is valid. If so, flow proceeds to block 622; otherwise, flow proceeds to block 624.

At block 622, control logic 302 schedules a writeback of the bottom stack cache 124 entry by generating a value on writeback_mux_select signal 328 to cause multiplexer 326 to select sc_data[15] 226, i.e., the bottom stack cache 124 entry cache line, for provision to writeback line buffer 324, and then generates a true value on writeback_request signal 338 to request bus interface unit 118 of FIG. 1 to write the cache line back to system memory of the L2 cache. Flow proceeds to block 624.

At block 624, control logic 302 asserts push_sc signal 232 to shift stack cache 124 down one entry and to store the push data, its tag, and MESI state onto stack cache 124 via sc_write_data signal 216, sc_write_tag signal 214, and sc_write_MESI signal 212, respectively. Flow proceeds to block 626.

At block 626, control logic 302 allocates a fill buffer to establish ownership for stack cache 124 of the cache line implicated by the destination address 336 of the push instruction and to fetch the implicated cache line into. In one embodiment, block 626 includes snooping non-stack cache 122 and the L2 cache and obtaining the implicated cache line from the non-stack cache 122 or L2 cache if it is present in either of the other two caches. Flow proceeds to block 628.

At block 628, the implicated cache line is received into the fill buffer allocated at block 626, and the cache line data is merged with the push data stored therein at block 624 into the top entry of stack cache 124. Flow ends at block 628.

Figure 7:
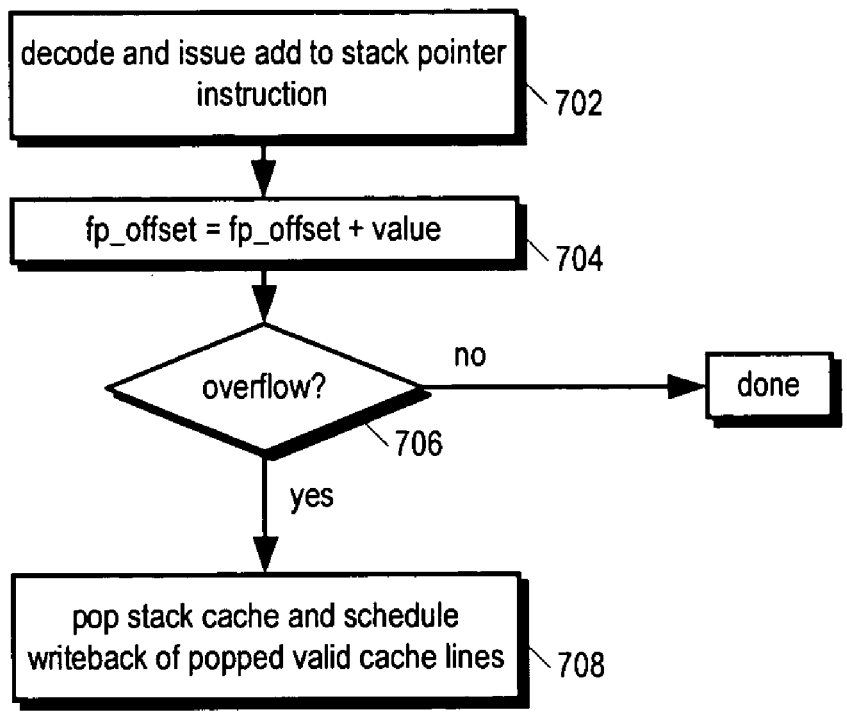
FIG. 7 is a flowchart illustrating operation of the microprocessor of FIG. 1 in response to an add to stack pointer instruction according to the present invention.

Referring now to FIG. 7, a flowchart illustrating operation of microprocessor 100 of FIG. 1 in response to an add to stack pointer instruction according to the present invention is shown. As described above, the fast pop operation takes advantage of the fact that in most well-behaved programs, there is a one-to-one correspondence between push instructions and pop instructions. That is, each push instruction is eventually followed by a corresponding pop instruction. However, there is at least one notable exception to this rule which regards the passing of subroutine parameters, which will now be described with respect to x86 instructions.

In the C language, for example, function parameters are passed on the system memory stack. A series of PUSH instructions, one for each parameter, is executed to push the parameters onto the stack. For example, before calling a function that receives five 4-byte parameters, the calling function executes five PUSH instructions to push the five parameters onto the stack. Then the calling function executes a CALL instruction, which pushes the return address onto the stack and transfers control to the subroutine. The last instruction the subroutine executes is a RET instruction, which pops the return address off the stack. The calling routine must now reclaim the space on the stack that was occupied by the parameters. One option is to execute a series of five POP instructions to restore the stack pointer to its value before the parameters were pushed onto the stack. However, since the parameters are not needed by the calling function, most compilers simply execute an ADD instruction to add the size of the space occupied by the parameters back to the stack pointer. That is, rather than executing five POP instructions, the compiler generates a single ADD instruction, which is faster and smaller. In the example above, the calling routine would add 20 to the stack pointer. This is the most common sequence in which PUSH and POP instructions do not match up. Consequently, in one embodiment, the fast pop apparatus advantageously decodes an instruction that adds a value to the stack pointer and updates the fp_offset 322 value accordingly. Flow begins in FIG. 7 at block 702.

At block 702, instruction translator 106 of FIG. 1 decodes an add instruction whose destination is stack pointer register 152 of FIG. 1, and instruction scheduler 108 of FIG. 1 issues the add instruction to the integer unit of execution units 114 of FIG. 1. In response, the integer unit generates a true value on add_sp_instr signal 352 of FIG. 3. Flow proceeds to block 704.

At block 704, control logic 302 generates a true value on add signal 382, and arithmetic unit 304 responsively adds add_sp_val 394 to fp_offset 396 and provides the sum on output 372, which control logic 302 causes multiplexer 316 to select via control signal 368 for loading into fp_offset register 322 of FIG. 3. Flow proceeds to decision block 706.

At decision block 706, control logic 302 examines overflow signal 392 to determine whether the add operation performed at block 704 caused an overflow of fp_offset 322. That is, control logic 302 determines whether the add instruction will cause the stack pointer 152 to wrap to another cache line. At block 706, an overflow condition is a condition in which the add causes stack pointer 152 to no longer reference the cache line stored in the top entry of stack cache 124. In particular, if the add causes an overflow, stack pointer 152 typically references the cache line whose memory address is immediately adjacent to and greater than the memory address of the cache line stored in the top entry of stack cache 124. Consequently, stack cache 124 must be popped in order for the correct cache line to be present in the top entry. In one embodiment, control logic 302 accommodates an add to stack pointer 152 that overflows more than one cache line. In this embodiment, the number of entries, N, popped from stack cache 124 at block 708 below is calculated as follows, assuming a cache line size of 64 bytes:

$$N = (fp\_\text{offset} + add\_sp\_val)/64$$

Hence, if N is greater than 1, then an overflow has occurred. If an overflow condition occurred, flow proceeds to block 708; otherwise flow ends.

At block 708, control logic 302 generates a true value on pop_sc signal 234 to pop the top entry off stack cache 124. First however, control logic 302 determines whether the cache line stored in the top entry is valid, and if so, schedules a writeback of the valid cache line to system memory or the L2 cache, similar to the manner in which the bottom entry of written back at block 622 of FIG. 6. As discussed above with respect to block 706, in one embodiment, the value of N is calculated, and N entries are popped from stack cache 124 and all valid cache lines in the N entries are written back. Flow ends at block 708.

Figure 8A:
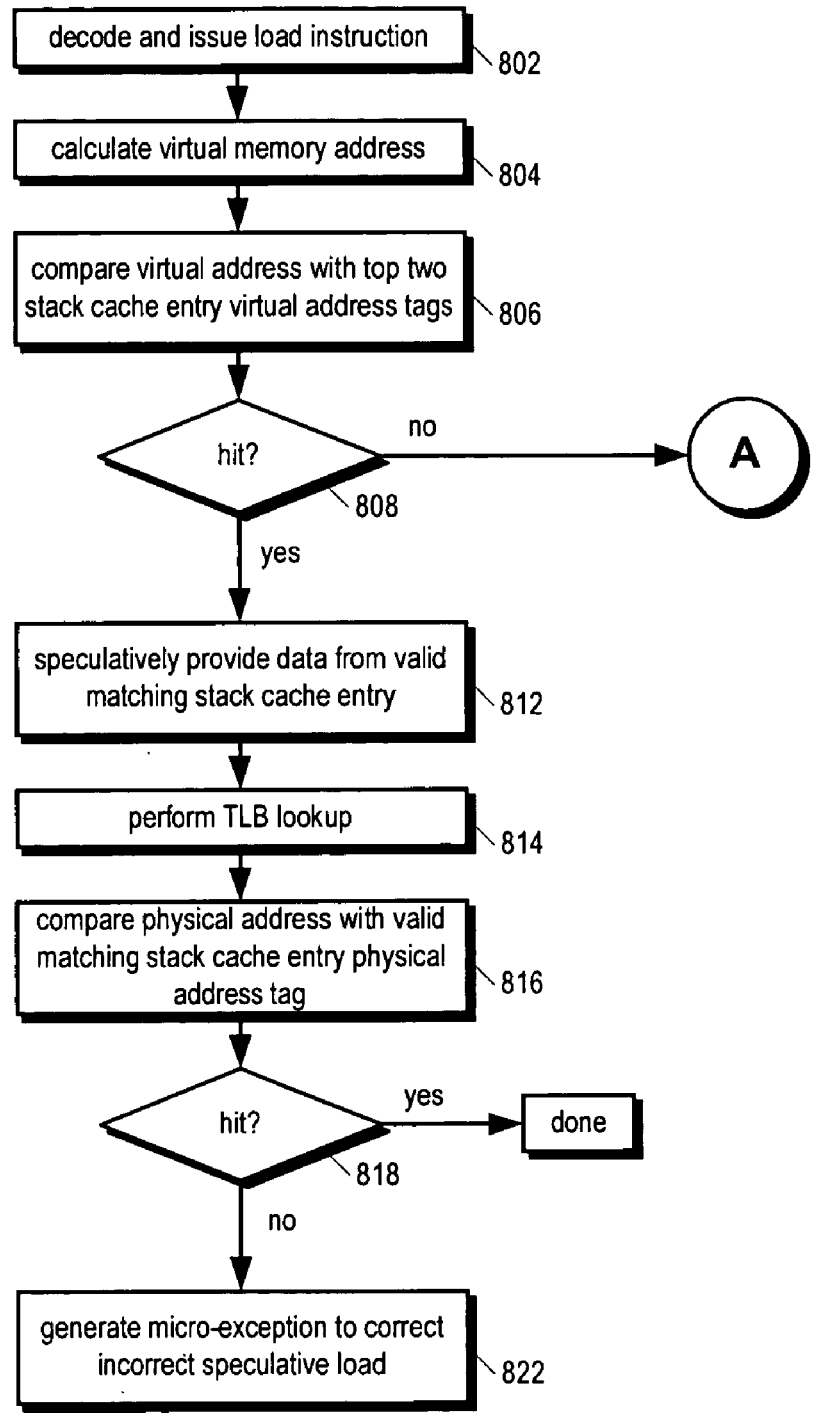
FIG. 8 is a flowchart illustrating a load operation from the stack cache of FIG. 1 according to the present invention.
Figure 8B:
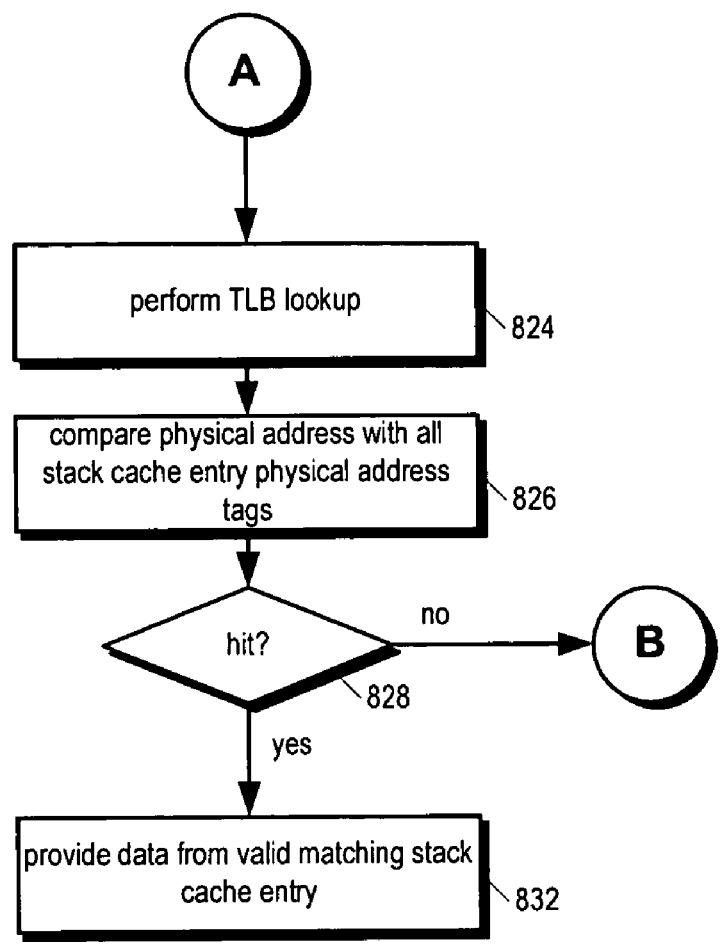
Figure 8C:
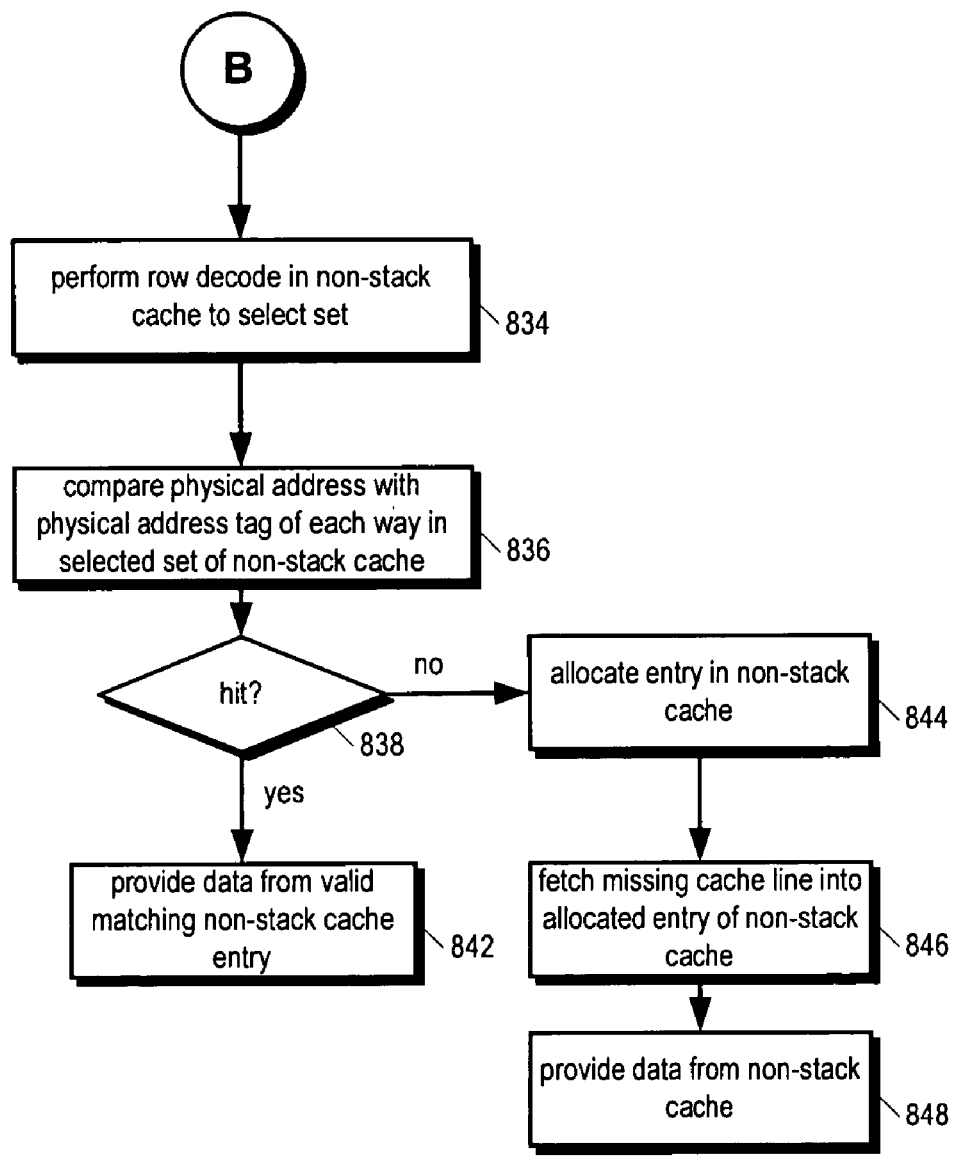

Referring now to FIG. 8, a flowchart illustrating a load operation from the stack cache 124 of FIG. 1 according to the present invention is shown. FIG. 8 comprises FIGS. 8A, 8B, and 8C, referred to collectively as FIG. 8. Generally, FIG. 8A illustrates a speculative load operation from stack cache 124 of FIG. 1; FIG. 8B illustrates a normal load operation from stack cache 124; and FIG. 8C illustrates a load from non-stack cache 122 of FIG. 1. Flow begins at block 802.

Another main use of the system memory stack in typical programs is to allocate space for subroutine local variables on the stack. The subroutine allocates space on the stack by decrementing the stack pointer by the amount of space allocated for the local variables. The local variables are then accessed by load instructions by an address calculated as an offset relative to the stack pointer. Consequently, there is a high probability that the load data will be in the same cache line as the most recently pushed data. Additionally, it is highly likely that the subroutine will execute load instructions to access the parameters pushed on the stack for it by the calling routine. There is a significant probability that the pushed parameters will span two cache lines, i.e., that one of the push instructions caused a wrap to the next cache line, as described with respect to blocks 618 through 628 of FIG. 6. Consequently, some of the parameters will be in the cache line in the next to top entry of stack cache 124 rather than the top entry or even in the next to next to top entry and so forth. Therefore, in one embodiment, the speculative load from stack cache 124 operation takes advantage of this fact by checking the stack cache 124 to see if the load data is present in the top two entries. By checking the top two entries directly, the row decode operation of a conventional cache memory is avoided, thereby potentially saving a clock cycle.

Additionally, in one embodiment, the speculative load potentially saves an additional clock cycle by using the load instruction virtual address 334 rather than the physical address 336 to perform the tag compare to see if the load data is present in the top two entries. If the virtual address matches one of the top two entries, then it is highly probable that the load data is present in the hitting entry, although not certain due to the possibility of virtual aliasing. In one embodiment of microprocessor 100, the cause of the stack cache 124 speculatively providing incorrect data on a speculative load operation is an operating system task switch, which may update memory paging information, thereby causing a false virtual address match. In one embodiment, particularly in a microprocessor 100 that employs a stack address segment register, such as the SS register in the x86 architecture, for example, the cause of the stack cache 124 speculatively providing incorrect data on a speculative load operation is an update of the stack segment register, which affects the effective address calculation, thereby potentially causing a false virtual address match.

Although FIG. 8 describes an embodiment in which the top two entries of stack cache 124 are checked as candidates for performing a speculative load operation, the speculative load operation is not limited to a particular number of top stack cache 124 entries to be checked, and various embodiments are contemplated in which various numbers of entries of stack cache 124 are checked by the speculative load from stack cache 124 operation.

At block 802, instruction translator 106 of FIG. 1 decodes a load instruction and instruction scheduler 108 of FIG. 1 issues the load instruction to the load unit of execution units 114 of FIG. 1. In response, load unit generates a true value on load_instr signal 346 of FIG. 3. Flow proceeds to block 804.

At block 804, address generator 306 calculates the source virtual address 334 of FIG. 3 of the load instruction. Flow proceeds to block 806.

At block 806, the two comparators 312 of FIG. 3 compare the virtual address 336 generated at block 804 with virtual sc_tag[1:0] 224 of FIG. 2 to generate VA_match[1:0] signal 362 of FIG. 3. Flow proceeds to decision block 808.

At decision block 808, control logic 302 of FIG. 3 examines sc_MESI[1:0] signal 222 of FIG. 2 and VA_match [1:0] signal 362 to determine whether either of the top two entries of stack cache 124 is valid and whether the source virtual address 334 of the load instruction matches the virtual portion of the tag 204 of the top two stack cache 124 entries, i.e., whether virtual address 334 hits in the top two entries of stack cache 124. If so, flow proceeds to block 812. Otherwise, flow proceeds to block 824 of FIG. 8B.

At block 812, in response to the true value on load_instr signal 346, control logic 302 generates a value on spec_sc_load_mux_sel signal 391 to cause multiplexer 412 to select for provision on signal 422 of FIG. 4 the one of the two cache lines sc_data[1:0] 226 of stack cache 124 that is determined at decision block 808 to have a valid virtual tag 204 that matches the source virtual address 334 of the load instruction. Additionally, multiplexer 404 selects a dword from cache line 422 specified by physical address[5:2] 336 for provision on signal 424 of FIG. 4. Further, control logic 302 generates a value on L1_mux_sel signal 395 of FIG. 3 to cause multiplexer 402 of FIG. 4 to select input 424 for provision on bus 138 to the load unit of execution units 114 for provision to the load instruction, which write-back stage 116 subsequently loads into one of the registers of register file 112 of FIG. 1 specified in the load instruction. As may be observed from FIG. 8A, the data is provided to the load unit speculatively. The operation is speculative because it has not yet been verified that the source physical address of the load instruction, which will be subsequently generated on physical address 336 at block 814, is the same as the address of the load data provided from one of the two top entries of stack cache 124 to the load unit. In response to detection at block 808 that virtual address 334 hits in the top two entries of stack cache 124, control logic 302 generates a true value on sc_hit signal 389, which is provided to the load unit of execution units 114. Flow proceeds to block 814.

At block 814, TLB 308 generates the source physical address 336 of the load instruction. Flow proceeds to block 816.

At block 816, two of the comparators 314 of FIG. 3 compare the physical address 336 generated at block 814 with the physical sc_tag[1:0] 224 from which the load data was speculatively provided at block 812 to generate the respective PA_match[1:0] signal 364 of FIG. 3. Flow proceeds to decision block 818.

At decision block 818, control logic 302 examines the PA_match[1:0] signal 364 corresponding to the entry of stack cache 124 from which the load data was speculatively provided at block 812 to determine whether the source physical address 336 of the load instruction matches the physical tag 204 of the entry, i.e., whether physical address 336 hits in the entry. If the load instruction source address 336 hits in the speculated entry of stack cache 124, flow ends, i.e., the speculative load operation provided the correct pop data. Otherwise, flow proceeds to block 822.

At block 822, control logic 302 generates a true value on exception signal 399 to cause microprocessor 100 to branch to an exception handler for handling the condition in which the speculative load operation provided the incorrect load data. The exception handler causes the correct data to be provided to the load instruction. In one embodiment, the exception handler loads the correct data from non-stack cache 122 or from system memory or the L2 cache. Flow ends at block 822.

As may be observed, and as will be discussed in more detail below with respect to FIG. 11, the speculative load operation from the stack cache 124 described with respect to FIG. 8A enables load data to be provided to a load instruction potentially multiple clock cycles faster than with a conventional cache memory.

At block 824 of FIG. 8B, TLB 308 generates the source physical address 336 of the load instruction. Flow proceeds to block 826.

At block 826, the comparators 314 of FIG. 3 compare the physical address 336 generated at block 824 with the physical sc_tag[15:0] 224 of each of the sixteen stack cache 124 entries to generate PA_match[15:0] signal 364. Flow proceeds to decision block 828.

At decision block 828, control logic 302 examines sc_MESI[15:0] signal 222 and PA_match[15:0] signal 364 to determine whether any of the stack cache 124 entries is valid and whether the source physical address 336 of the load instruction matches the physical tag 204 of a valid stack cache 124 entry, i.e., whether physical address 336 hits in stack cache 124. If the load instruction source address 336 hits in stack cache 124, flow proceeds to block 832; otherwise, flow proceeds to block 834 of FIG. 8C.

At block 832, in response to the true value on load_instr signal 346, and in response to the source virtual address 334 of the load instruction missing in the top two entries of stack cache 124, and in response to the load instruction source address 336 hitting in stack cache 124, control logic 302 generates a value on normal_sc_load_mux_sel signal 393 to cause multiplexer 408 to select for provision on signal 428 of FIG. 4 the one of the sixteen cache lines sc_data[15:0] 226 of stack cache 124 that is determined at decision block 828 to have a valid physical tag 204 that matches the source physical address 336 of the load instruction. Additionally, multiplexer 406 selects a dword from cache line 428 specified by physical address[5:2] 336 for provision on signal 426 of FIG. 4. Further, control logic 302 generates a value on L1_mux_sel signal 395 to cause multiplexer 402 to select input 426 for provision on bus 138 to the load unit of execution units 114 for provision to the load instruction, which write-back stage 116 subsequently loads into one of the registers of register file 112 of FIG. 1 specified in the load instruction. In response to detection at block 828 that physical address 336 hits in stack cache 124, control logic 302 generates a true value on sc_hit signal 389, which is provided to the load unit of execution units 114. Flow ends at block 832.

As may be observed, and as will be discussed in more detail below with respect to FIG. 12, the normal load operation from the stack cache 124 described with respect to FIG. 8B enables load data to be provided to a load instruction potentially at least one clock cycle faster than with a conventional cache memory, such as non-stack cache 122.

At block 834 of FIG. 8C, non-stack cache 122 receives an index portion of physical address 336 generated at block 824 of FIG. 8B and responsively performs a row decode of the index to select a row, or set of ways, in non-stack cache 122. Flow proceeds to block 836.

At block 836, non-stack cache 122 compares an upper, or tag, portion of physical address 336 generated at block 824 with the physical address tag of each way in the set selected at block 834. Flow proceeds to decision block 838.

At decision block 838, non-stack cache 122 examines the comparison results of block 836 and valid bits of the selected ways to determine whether the load physical address 336 hits in non-stack cache 122. If so, flow proceeds to block 842; otherwise, flow proceeds to block 844.

At block 842, non-stack cache 122 provides the load data from the entry of non-stack cache 122 in which the physical address 336 hit. Flow ends at block 842.

At block 844, in response to the determination at decision block 838 that the load physical address 336 misses in non-stack cache 122, non-stack cache 122 allocates an entry therein for loading the missing cache line implicated by the load instruction physical address 336. Flow proceeds to block 846.

At block 846, non-stack cache 122 fetches the missing cache line from system memory or the L2 cache into the entry of non-stack cache 122 allocated at block 844. Flow proceeds to block 848.

At block 848, non-stack cache 122 provides the load data from the cache line fetched at block 846. Flow ends at block 848.

In one embodiment, blocks 834 through 848 of FIG. 8C are performed according to conventional cache techniques. That is, FIG. 8C depicts a conventional load from conventional non-stack cache 122, which is performed in the event that the load address 336 misses in stack cache 124.

Figure 9:
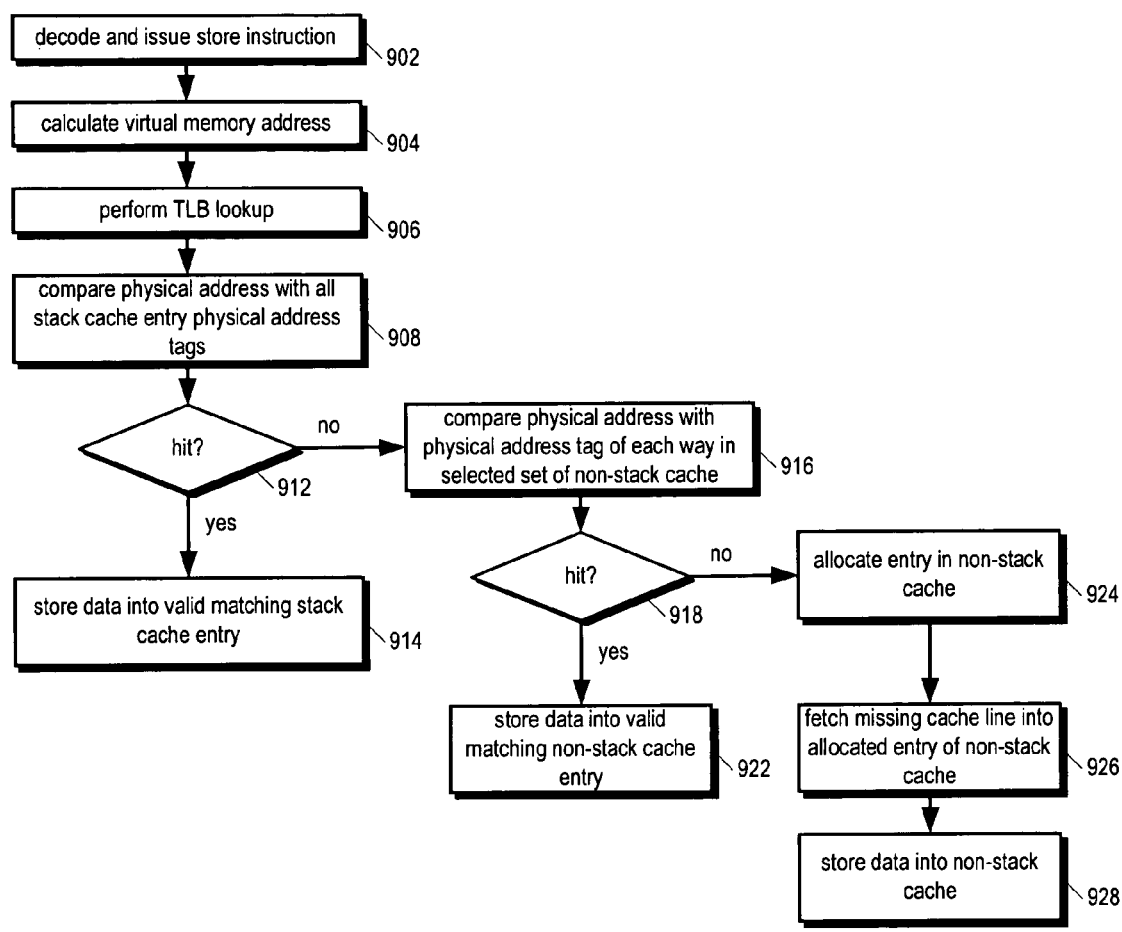
FIG. 9 is a flowchart illustrating a store operation to the L1 data cache of FIG. 1 according to the present invention.

Referring now to FIG. 9, a flowchart illustrating a store operation to the L1 cache 126 of FIG. 1 according to the present invention is shown. Flow begins at block 902.

At block 902, instruction translator 106 of FIG. 1 decodes a store instruction and instruction scheduler 108 of FIG. 1 issues the store instruction to the store unit of execution units 114 of FIG. 1. In response, store unit generates a true value on store_instr signal 348 of FIG. 3. Flow proceeds to block 904.

At block 904, address generator 306 calculates the destination virtual address 334 of FIG. 3 of the store instruction. Flow proceeds to block 906.

At block 906, TLB 308 generates the destination physical address 336 of FIG. 3 of the store instruction. Flow proceeds to block 908.

At block 908, the comparators 314 of FIG. 3 compare the physical address 336 generated at block 906 with the physical sc_tag[15:0] 224 of each of the sixteen stack cache 124 entries to generate PA_match[15:0] signal 364. Flow proceeds to decision block 912.

At decision block 912, control logic 302 examines sc_MESI[15:0] signal 222 and PA_match[15:0] signal 364 to determine whether any of the stack cache 124 entries is valid and whether the destination physical address 336 of the store instruction matches the physical tag 204 of a valid stack cache 124 entry, i.e., whether physical address 336 hits in stack cache 124. If the store instruction destination address 336 hits in stack cache 124, flow proceeds to block 914; otherwise, flow proceeds to block 916.

At block 914, the store data is stored into the valid matching entry of stack cache 124 determined at decision block 912 via sc_write_data signal 216 into the dword offset of the cache line 206 indicated by address bits [5:2] of physical address 336. If necessary, the MESI state 202 of the top entry is updated via sc_write_MESI signal 212, such as to a value of Modified. The store data is obtained from the register or memory location specified by the store instruction. For example, if the store instruction is an x86 MOV instruction specifying a general purpose register as the source of the store data, then the store data is in the register of register file 112 specified as the source operand in the MOV instruction. In response to detection at block 912 that physical address 336 hits in stack cache 124, control logic 302 generates a true value on sc_hit signal 389, which is provided to the store unit of execution units 114. Flow ends at block 914.

At block 916, the tag portion of the physical address 336 generated at block 906 is compared with the physical tag of each way in the set of non-stack cache 122 selected by the index portion of physical address 336. Flow proceeds to decision block 918.

At decision block 918, control logic 302 examines non-sc_hit signal 366 to determine whether the destination physical address 336 of the store instruction hits in non-stack cache 122. If so, flow proceeds to block 922; otherwise, flow proceeds to block 924.

At block 922, the store data is stored into the valid matching way of the selected set of non-stack cache 122 determined at decision block 918. Flow ends at block 922.

At block 924, in response to the determination at decision block 918 that the store physical address 336 misses in non-stack cache 122, non-stack cache 122 allocates an entry therein for storing the missing cache line implicated by the store instruction physical address 336. Flow proceeds to block 926.

At block 926, non-stack cache 122 fetches the missing cache line from system memory or the L2 cache into the entry of non-stack cache 122 allocated at block 924. Flow proceeds to block 928.

At block 928, non-stack cache 122 stores the store data into the cache line fetched at block 926. Flow ends at block 928.

In one embodiment, blocks 902 through 906 and 916 through 928 of FIG. 9 are performed according to conventional cache techniques. That is, blocks 902 through 906 and 916 through 928 depict a conventional store to conventional non-stack cache 122, which is performed in the event that the store address 336 misses in stack cache 124.

Referring now to FIG. 10, a timing diagram illustrating the timing of a fast pop operation of FIG. 5 from the stack cache 124 of FIG. 1 according to the present invention is shown. FIG. 10 includes four columns denoted 1 through 4, corresponding to four clock cycles of microprocessor 100. FIG. 10 also includes five rows each labeled to signify a distinct action or result of microprocessor 100. Each rectangle of a given row and column of FIG. 10 is either blank or includes the word "pop" to indicate the location of the pop instruction as it proceeds down the microprocessor 100 pipeline.

In clock cycle 1, according to the first row of FIG. 10, the load unit of execution units 114 of FIG. 1 generates a true value on pop_instr signal 344 of FIG. 3 to request pop data for a pop instruction, according to block 502 of FIG. 5.

In clock cycle 2, according to the second row, stack cache 124 of FIG. 1 provides data to the pop instruction from the cache line in the top entry specified by fp_offset 396, according to block 504 of FIG. 5. In particular, multiplexer 318 selects a dword 398 specified by fp_offset 396 from among the sixteen dwords provided on sc_data[0] 226 from the top stack cache 124 entry, and multiplexer 402 selects the fp_data input 398. Additionally, stack cache 124 indicates a hit of the pop instruction to the load unit on sc_hit signal 389. That is, stack cache 124 indicates to the load unit that the data for the pop instruction is present in stack cache 124. As discussed above with respect to FIG. 5, the hit indication sc_hit 389 is speculative because it has not yet been verified that the source address of the pop instruction, which will be generated in clock cycle 3, is the same as the address of the pop data that will be provided from the top entry of stack cache 124 to the load unit in clock cycle 3. In one embodiment, the sc_hit signal 389 indicating the hit of the pop instruction to the load unit is gated with the valid bit sc_MESI[0] 222 of FIG. 2, such that stack cache 124 does not indicate a hit of the pop instruction to the load unit unless the top entry in stack cache 124 is valid. That is, although control logic 302 does not verify an address match before signifying a pop hit, it does verify that the top entry in stack cache 124 is valid.

In clock cycle 2, according to the third row, address generator 306 calculates virtual address 334 of FIG. 3, according to block 514 of FIG. 5.

In clock cycle 3, according to the fourth row, TLB 308 generates the source physical address 336 of FIG. 3 of the pop instruction, according to block 516 of FIG. 5.

In clock cycle 4, according to the fifth row, control logic 302 detects a condition in which stack cache 124 provided the incorrect pop data, according to blocks 518 through 524 of FIG. 5.

As may be seen by comparing FIG. 10 with FIG. 13, which is described below, the fast pop operation advantageously enables L1 data cache 126 to potentially provide data for pop instructions multiple clock cycles sooner than a conventional cache, which does not distinguish between pop instructions and load instructions.

In one embodiment, bits [5:2] of physical address 336 are used to select the dword rather than fp_offset 396, and the data is provided in clock cycle 3 rather than clock cycle 2.

Referring now to FIG. 11, a timing diagram illustrating the timing of a speculative load from the stack cache 124 operation of FIG. 8 according to the present invention is shown. FIG. 11 includes four columns denoted 1 through 4, corresponding to four clock cycles of microprocessor 100. FIG. 11 also includes six rows each labeled to signify a distinct action or result of microprocessor 100. Each rectangle of a given row and column of FIG. 11 is either blank or includes the word "load" to indicate the location of the load instruction as it proceeds down the microprocessor 100 pipeline.

In clock cycle 1, according to the first row of FIG. 11, the load unit of execution units 114 of FIG. 1 generates a true value on load_instr signal 346 of FIG. 3 to request load data for a load instruction, according to block 802 of FIG. 8.

In clock cycle 2, according to the second row, address generator 306 calculates virtual address 334 of FIG. 3, according to block 804 of FIG. 8.

In clock cycle 3, according to the third row, comparators 312 of FIG. 3 perform a virtual tag compare to generate VA_match[1:0] signals 362 of FIG. 3, according to block 806 of FIG. 8. Additionally, control logic 302 generates spec_sc_load_mux_sel 391 of FIG. 3 based on VA_match [1:0] signals 362 and sc_MESI[1:0] signal 222 of FIG. 2, according to block 812 of FIG. 8. Additionally, stack cache 124 of FIG. 1 indicates a hit of the load instruction to the load unit via sc_hit signal 389, according to block 812 of FIG. 8. That is, stack cache 124 indicates to the load unit that the data for the load instruction is present in stack cache 124. As discussed above with respect to FIG. 8, the hit indication is speculative because it has not yet been verified that the physical source address 336 of the load instruction, which is generated in clock cycle 3, is the same as the address of the load data that will be provided from stack cache 124 to the load unit in clock cycle 4.

In clock cycle 3, according to the fourth row, TLB 308 generates the source physical address 336 of FIG. 3 of the pop instruction, according to block 814 of FIG. 8.

In clock cycle 4, according to the fifth row, the load data is provided to the load unit, according to block 812 of FIG. 8. In particular, multiplexer 412 of FIG. 4 selects one of the two cache lines sc_data[1:0] 226 based on spec_sc_load_mux_sel 391, multiplexer 404 of FIG. 4 selects the appropriate dword based on physical address [5:2] 336, and multiplexer 402 selects input 424.

In clock cycle 4, according to the sixth row, control logic 302 detects a condition in which stack cache 124 provided the incorrect load data, according to blocks 816 through 822 of FIG. 8.

As may be seen by comparing FIG. 11 with FIG. 13, which is described below, the speculative load operation advantageously enables L1 data cache 126 to potentially provide data for load instructions multiple clock cycles sooner than a conventional cache.

Referring now to FIG. 12, a timing diagram illustrating the timing of a normal, i.e., non-speculative, load from stack cache 124 operation of FIG. 8 according to the present invention is shown. FIG. 12 includes five columns denoted 1 through 5, corresponding to five clock cycles of microprocessor 100. FIG. 12 also includes five rows each labeled to signify a distinct action or result of microprocessor 100. Each rectangle of a given row and column of FIG. 12 is either blank or includes the word "load" to indicate the location of the load instruction as it proceeds down the microprocessor 100 pipeline.

In clock cycle 1, according to the first row of FIG. 12, the load unit of execution units 114 of FIG. 1 generates a true value on load_instr signal 346 of FIG. 3 to request load data for a load instruction, according to block 802 of FIG. 8.

In clock cycle 2, according to the second row, address generator 306 calculates virtual address 334 of FIG. 3, according to block 804 of FIG. 8.

In clock cycle 3, according to the third row, TLB 308 generates the source physical address 336 of FIG. 3 of the pop instruction, according to block 824 of FIG. 8.

In clock cycle 4, according to the fourth row, comparators 314 of FIG. 3 perform a physical tag compare to generate PA_match[15:0] signals 364 of FIG. 3, according to block 826 of FIG. 8. Additionally, control logic 302 generates normal_sc_load_mux_sel 393 of FIG. 3 based on PA_match [15:0] signals 364 and sc_MESI[15:0] signal 222 of FIG. 2, according to block 832 of FIG. 8. Additionally, stack cache 124 of FIG. 1 indicates a hit of the load instruction to the load unit via sc_hit signal 389, according to block 832 of FIG. 8.

In clock cycle 5, according to the fifth row, the load data is provided to the load unit, according to block 832 of FIG. 8. In particular, multiplexer 408 of FIG. 4 selects one of the sixteen cache lines sc_data[15:0] 226 based on normal_sc_load_mux_sel 393, multiplexer 406 of FIG. 4 selects the appropriate dword based on physical address [5:2] 336, and multiplexer 402 selects input 426.

As may be seen by comparing FIG. 12 with FIG. 13, which is described below, the normal load operation advantageously enables L1 data cache 126 to potentially provide data for load instructions sooner than a conventional cache.

Referring now to FIG. 13, a timing diagram illustrating the timing of a load from non-stack cache 122 operation of FIG. 8 according to the present invention is shown. FIG. 13 includes six columns denoted 1 through 6, corresponding to six clock cycles of microprocessor 100. FIG. 13 also includes six rows each labeled to signify a distinct action or result of microprocessor 100. Each rectangle of a given row and column of FIG. 13 is either blank or includes the word "load" to indicate the location of the load instruction as it proceeds down the microprocessor 100 pipeline.

In clock cycle 1, according to the first row of FIG. 13, the load unit of execution units 114 of FIG. 1 generates a true value on load_instr signal 346 of FIG. 3 to request load data for a load instruction, according to block 802 of FIG. 8.

In clock cycle 2, according to the second row, address generator 306 calculates virtual address 334 of FIG. 3, according to block 804 of FIG. 8.

In clock cycle 3, according to the third row, TLB 308 generates the source physical address 336 of FIG. 3 of the pop instruction, according to block 824 of FIG. 8.

In clock cycle 4, according to the fourth row, non-stack cache 122 performs a conventional row decode based on the index portion of physical address 336 and reads the data from each of the ways of the set specified by the result of the row decode.

In clock cycle 5, according to the fifth row, non-stack cache 122 performs a physical tag compare of the tag portion of physical address 336 with the tags of each way of the selected set. Based on the tag compares and the valid bits of each way, non-stack cache 122 generates a way select signal to select the matching valid way.

In clock cycle 6, according to the sixth row, non-stack cache 122 muxes out the cache line specified by the way select and muxes out the appropriate dword of the selected cache line based on the lower bits of physical address 336.

It is noted with respect to the timing diagrams of FIGS. 10 through 13 that other embodiments are contemplated in which the various functions described, such as address comparisons and multiplexing, are grouped into different clock cycles, and the fast pop, speculative load, normal load, and load from the non-stack cache 122 are not limited to the particular embodiments shown.

As may be observed from the preceding description, an advantage of having a distinct stack cache 124 and non-stack cache 122 is that the arrangement effectively increases the size of the L1 data cache 126 over a conventional unitary cache that does not distinguish between stack and non-stack accesses, without increasing the access time of the L1 data cache 126. Furthermore, by not polluting the non-stack cache 122 with stack data, the efficiency of the non-stack cache 122 is increased over a conventional cache memory of the same size with respect to the entirety of the data accessed by a program. Additionally, the stack cache 124 advantageously provides faster accesses for most pop instructions by recognizing that, due to the LIFO nature of stack accesses, the data requested by a pop instruction is highly likely to be at the top of the stack cache 124 since it was highly likely the most recently pushed, or newest, data in the stack cache 124. Therefore, the stack cache 124 speculatively provides the pop data before determining whether the pop address actually hits in the stack cache 124. Furthermore, the stack cache 124 advantageously provides faster accesses for most load instructions that access stack data by recognizing that, due to the LIFO nature of stack accesses, the load data is highly likely to be in the cache line or lines near the top of the stack cache 124. Therefore, the stack cache 124 speculatively provides the load data from one of the top stack cache entries based on a virtual address compare before performing a physical address compare to definitely determine that the load data is present. This allows the stack cache 124 to provide the load data sooner in most cases than if a physical address compare was first performed, since additional time is required to translate the virtual address to a physical address. Finally, if the load virtual address does not hit in the top stack cache 124 entries such that the load data cannot be speculatively provided to the load instruction, the stack cache 124 provides the load data if the load physical address hits in the stack cache 124. If the load physical address does not hit in the stack cache 124, the non-stack cache 122 provides the load data. Hence, the latency time required to read data from the stack cache 124 is variable, with more predictable accesses requiring less clock cycles. The latency varies in one aspect depending upon the type of instruction reading the stack cache 124. The latency varies in another aspect depending upon the location of the requested data within the stack cache 124.

Figure 14:
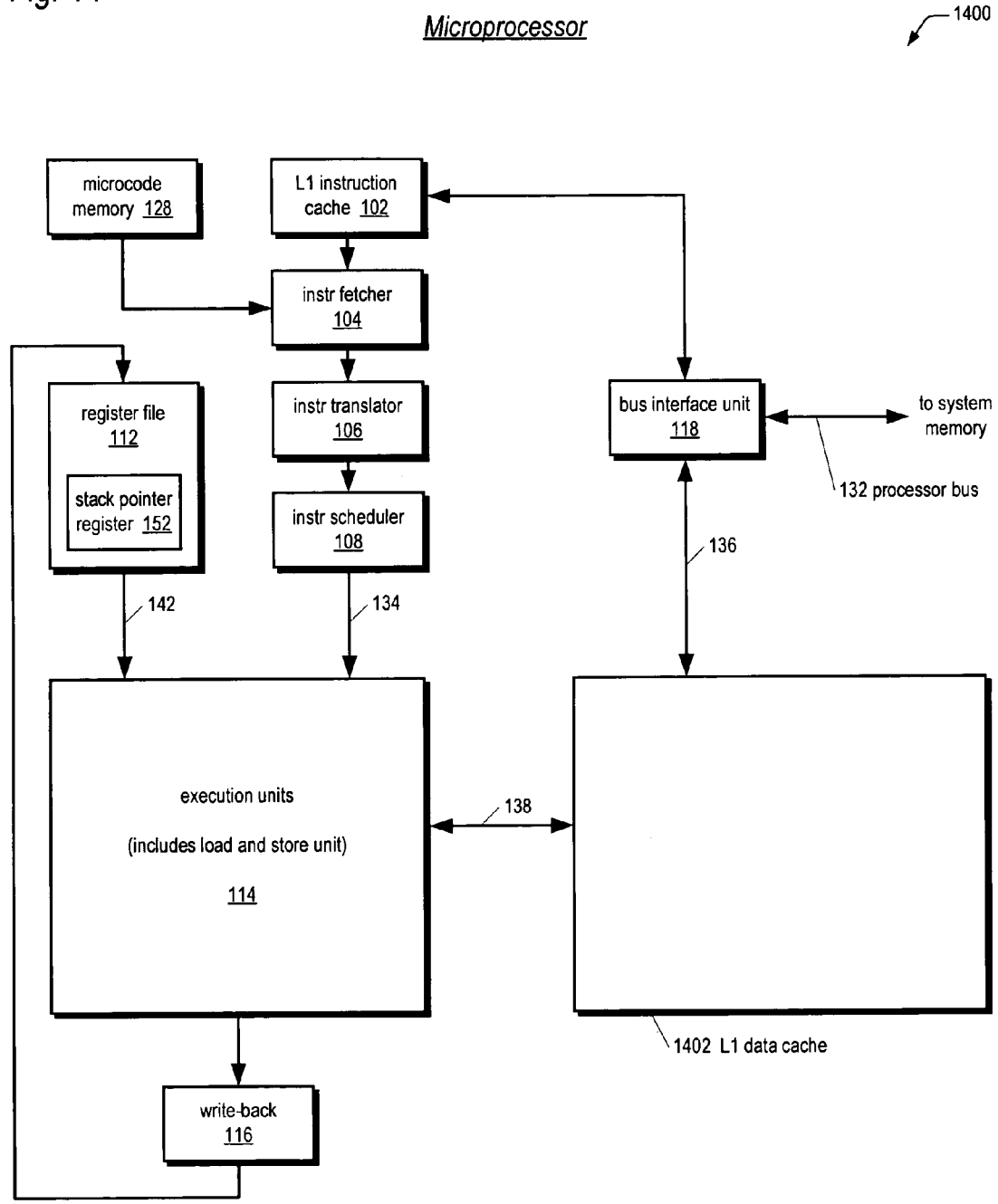
FIG. 14 is a block diagram of a pipelined microprocessor according to the present invention.

Referring now to FIG. 14, a block diagram of a pipelined microprocessor 1400 according to the present invention is shown. Microprocessor 1400 is similar to microprocessor 100 of FIG. 1, except that microprocessor 1400 includes an L1 data cache 1402 that does not include a stack cache 124. L1 data cache 1402 of FIG. 14 comprises a conventional L1 data cache having an apparatus for performing a fast pop operation from L1 data cache 1402, as described below.

Figure 15:
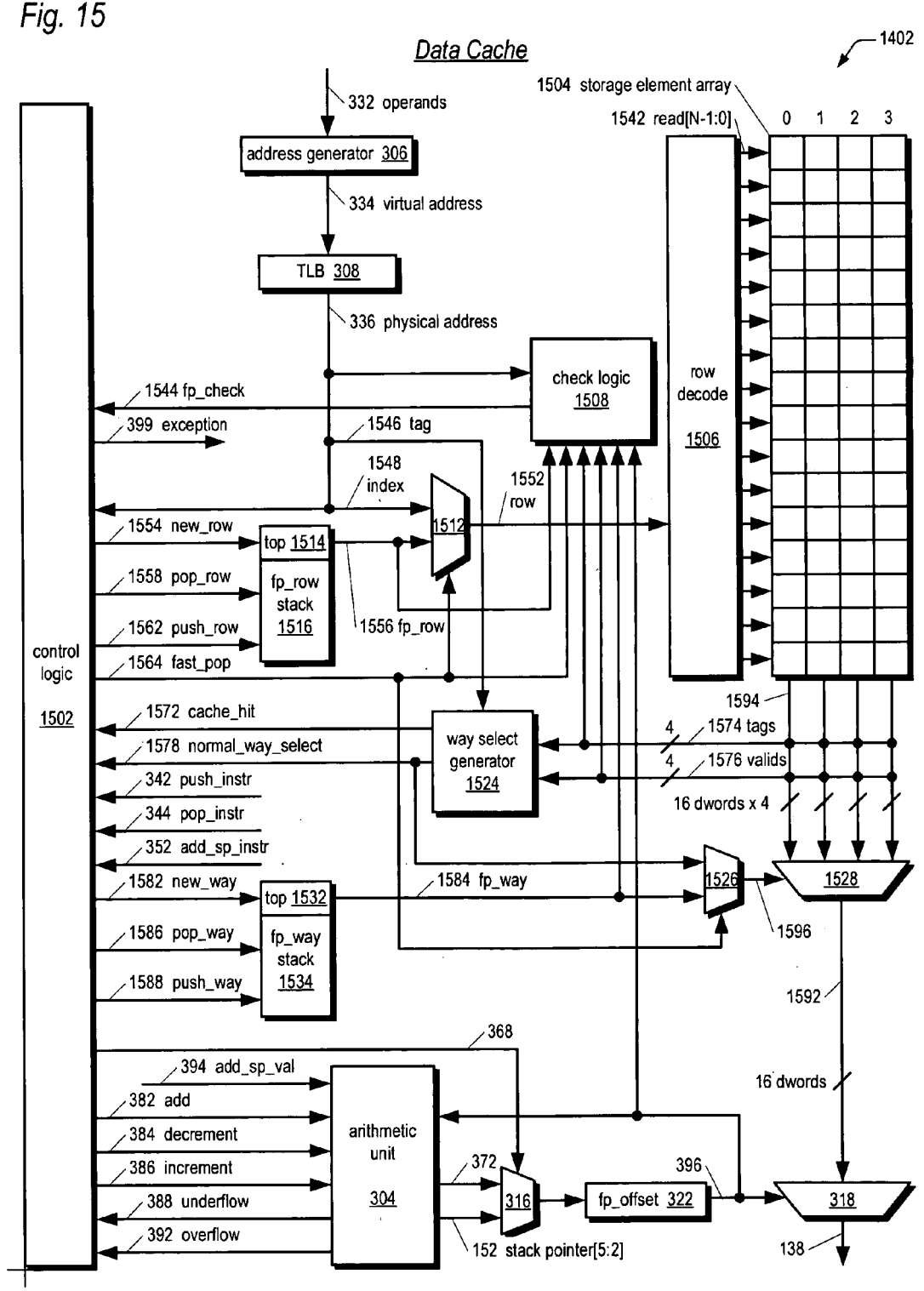
FIG. 15 is a block diagram illustrating the L1 data cache of FIG. 14 according to the present invention.

Referring now to FIG. 15, a block diagram illustrating the L1 data cache 1402 of FIG. 14 according to the present invention is shown. Several elements of FIG. 15 are similar to and function similar to elements of FIG. 3, and similar elements are numbered correspondingly. In particular, data cache 1402 includes address generator 306 that receives operands 332 and generates virtual address 334; TLB 308 that receives virtual address 334 and generates physical address 336; arithmetic unit 304 that receives add signal 382, decrement signal 384, and increment signal 386, and generates underflow signal 388, and overflow signal 392; and multiplexer 316, multiplexer 318, fp_offset register 322, add_sp_val signal 394, stack pointer register bits [5:2] 152, output signal 372, and fp_offset signal 396 that function similarly to like-numbered elements described with respect to FIG. 3, except where described differently below. Data cache 1402 also includes control logic 1502, which functions in some ways similarly to control logic 302 of FIG. 3. Control logic 1502 receives push_instr signal 342, pop_instr signal 344, and add_sp_instr signal 352 similar to control logic 302 of FIG. 3. Control logic 1502 generates mux select signal 368 similar to control logic 302 of FIG. 3. Control logic 1502 generates exception signal 399 in response to detection of an incorrect fast pop operation similar to like numbered signal of FIG. 3, except where described differently below.

Data cache 1402 also includes a storage element array 1504, for storing a plurality of cache lines, an address tag of each of the cache lines, and a cache status, such as MESI state, of each of the cache lines. In the embodiment of FIG. 15, storage element array 1504 is configured to have N rows, or sets, and four columns, or ways. That is, data cache 1402 is configured as a four-way set associative cache memory. However, the present invention is not limited to a cache with a particular number of ways. In one embodiment, the size of a cache line stored in storage element array 1504 comprises 64 bytes.

Data cache 1402 also includes a row decode circuit 1506. Row decoder 1506 receives a row signal 1552 specifying one of the N rows of storage element array 1504. Row decoder 1506 generates a true value on one of a plurality of read[N-1:0] signals 1542 specified by the row signal 1552. In response, storage element array 1504 outputs the contents 1594 of the row specified by the true read[N-1:0] signal 1542. That is, the cache line data, tag, and MESI state of each way of the selected row is output on signal 1594. In the embodiment of FIG. 15, four cache lines each comprising sixteen dwords are output on signal 1594, along with their associated tags 1574 and valid bits 1576 of the MESI state.

Data cache 1402 also includes a four-input multiplexer 1528 coupled to storage element array 1504. Multiplexer 1528 receives on each of its four inputs one of the respective four cache lines 1594 output by storage element array 1504. Multiplexer 1528 selects one of the cache lines to output on a signal 1592 based on a control input 1596. The cache line selected 1592 is provided to multiplexer 318, which provides a dword on bus 138 based on fp_offset signal 396.

Data cache 1402 also includes a fast_pop signal 1564 generated by control logic 1502. Control logic 1502 generates a true value on fast_pop signal 1564 in response to a true value on pop_instr signal 344 to cause a fast_pop operation to be performed from data cache 1402.

Data cache 1402 also includes a first stack of storage elements, or entries, referred to as fp_row stack 1516, coupled to control logic 1502. The fp_row stack 1516 comprises a plurality of storage elements each for storing a value identifying a row of storage element array 1504. In one embodiment, each element of fp_row stack 1516 stores $\log_2 N$ bits, wherein N is the number of rows of storage element array 1504. The plurality of storage elements of fp_row stack 1516 are arranged as a stack, or LIFO, which includes a top entry 1514 that stores the most recently pushed row value provided on new_row signal 1554 by control logic 1502. That is, new_row signal 1554 specifies the row within storage element array 1504 that stores the cache line containing the data of the most recent push instruction, as described in detail below with respect to FIG. 17. Advantageously, storing the row containing the most recent push data enables data cache 1402 to perform a fast pop operation as described below. The fp_row stack 1516 also receives a push_row signal 1562 from control logic 1502. When control logic 1502 asserts a true value on push_row signal 1562, fp_row stack 1516 is shifted down one entry, i.e., the bottom entry is shifted out of fp_row stack 1516 and each of the other entries receives the value of the entry immediately above it, and the value on new_row 1554 is written into the top entry of fp_row stack 1516. The fp_row stack 1516 also receives a pop_row signal 1558 from control logic 1502. When control logic 1502 asserts a true value on pop_row signal 1558, fp_row stack 1516 is shifted up one entry, i.e., the top entry is shifted out of fp_row stack 1516, and each of the other entries receives the value of the entry immediately below it.

Data cache 1402 also includes a two-input multiplexer 1512 coupled to fp_row stack 1516. On one input, multiplexer 1512 receives the value of the top entry 1514 of fp_row stack 1516, denoted fp_row 1556. On the, other input, multiplexer 1512 receives an index, or row select, portion 1548 of physical address 336 from TLB 308. In one embodiment, index 1548 comprises lower address bits of physical address 336. If fast_pop signal 1564 is true, then multiplexer 1512 selects fp_row signal 1556 for output on row signal 1552 for provision to row decoder 1506; otherwise, multiplexer 1512 selects index 1548 for output on row signal 1552.

Data cache 1402 also includes a second stack of storage elements, or entries, referred to as fp_way stack 1534, coupled to control logic 1502. The fp_way stack 1534 comprises a plurality of storage elements each for storing a value identifying a way of storage element array 1504. In the embodiment of FIG. 15, each element of fp_way stack 1534 stores 2 bits, for specifying one of the four ways of storage element array 1504. The plurality of storage elements of fp_way stack 1534 are arranged as a stack, or LIFO, which includes a top entry 1532 that stores the most recently pushed way value provided on new_way signal 1582 by control logic 1502. That is, new_way signal 1582 specifies the way within the row of storage element array 1504 specified by new_row signal 1554 that stores the cache line containing the data of the most recent push instruction, as described in detail below with respect to FIG. 17. Advantageously, storing the way containing the most recent push data enables data cache 1402 to perform a fast pop operation as described below. The fp_way stack 1534 also receives a push_way signal 1588 from control logic 1502. When control logic 1502 asserts a true value on push_way signal 1588, fp_way stack 1534 is shifted down one entry, i.e., the bottom entry is shifted out of fp_way stack 1534 and each of the other entries receives the value of the entry immediately above it, and the value on new_way 1582 is written into the top entry 1532 of fp_way stack 1534. The fp_way stack 1534 also receives a pop_way signal 1586 from control logic 1502. When control logic 1502 asserts a true value on pop_way signal 1586, fp_way stack 1534 is shifted up one entry, i.e., the top entry is shifted out of fp_way stack 1534, and each of the other entries receives the value of the entry immediately below it.

In one embodiment, fp_row stack 1516 and fp_way stack 1534 are comprised in a single stack of storage elements that each store a row/way pair.

Data cache 1402 also includes a two-input multiplexer 1526 coupled to fp_way stack 1534. On one input, multiplexer 1526 receives the value of the top entry 1532 of fp_way stack 1534, denoted fp_way 1584. On the other input, multiplexer 1526 receives a normal_way_select signal 1578. If fast_pop signal 1564 is true, then multiplexer 1526 selects fp_way signal 1584 for output on mux select signal 1596 for provision to multiplexer 1528; otherwise, multiplexer 1526 selects normal_way_select signal 1578 for output on mux select signal 1596.

In one embodiment, each entry of fp_way stack 1534 and fp_row stack 1516 includes a valid bit, and fast_pop signal 1564 is gated with the logical AND of the valid bit of top entry 1514 and top entry 1532. That is, although control logic 1502 does not verify a pop source address match before performing a fast pop, it does verify that the top entry 1514 in fp_row stack 1516 is valid and that the top entry 1532 in fp_way stack 1534 is valid before performing a fast pop operation. In this embodiment, each time the fp_row stack 1516 or fp_way stack 1534 is popped, the bottom entry after shifting up has its valid bit set to false.

Data cache 1402 also includes a way select generator 1524 coupled to control logic 1502. Way select generator 1524 receives each of the address tags 1574 and valid bits 1576 from the selected row of storage element array 1504. Way select generator 1524 also receives an address tag portion 1546 of physical address 336 from TLB 308. Way select generator 1524 compares physical address tag 1546, such as of a pop, push, load, or store instruction, with each of the tags 1574 output by storage element array 1504. If one of the tags 1574 matches the physical address tag 1546 and its corresponding valid bit 1576 indicates that tag 1574 is valid, then way select generator 1524 generates a true value on a cache_hit signal 1572 provided to control logic 1502. In addition, way select generator 1524 provides the value of the valid matching way, i.e., the way that hits in storage element array 1504, on normal_way_select signal 1578, which is provided to control logic 1502 and to multiplexer 1526.

Data cache 1402 also includes check logic 1508, coupled to storage element array 1504. Check logic 1508 receives physical address 336, fast_pop signal 1564, fp_row signal 1556, fp_way signal 1584, tags 1574, valids 1576, and fp_offset signal 396. Check logic 1508 checks to determine whether the data speculatively provided to a pop instruction during a fast pop operation is the correct data. Check logic 1508 determines whether the correct row and way values provided by fp_row 1556 and fp_way 1584, respectively, were used during the fast pop operation to select the correct cache line in storage element array 1504 to provide the correct pop data. In one embodiment, check logic 1508 compares the value of fp_row 1556 used in the fast pop operation with the tag 1574 of the way specified by fp_way 1584 in the fast pop operation. In one embodiment, check logic 1508 also compares the fp_row 1556 value used in the fast pop operation with the corresponding bits of physical address 336. In one embodiment, check logic 1508 also compares the value of fp_offset 396 used in the fast pop operation with the corresponding bits of physical address 336. Check logic 1508 also verifies that the valid bit 1576 of the way specified by fp_way 1584 indicates the cache line accessed in the fast pop operation was a valid cache line. If the cache line was not valid, or the correct cache line was not accessed, then check logic 1508 generates a false value on an fp_check signal 1544, which is provided to control logic 1502. Otherwise, check logic 1508 generates a true value on an fp_check signal 1544, which is provided to control logic 1502.

Figure 16:
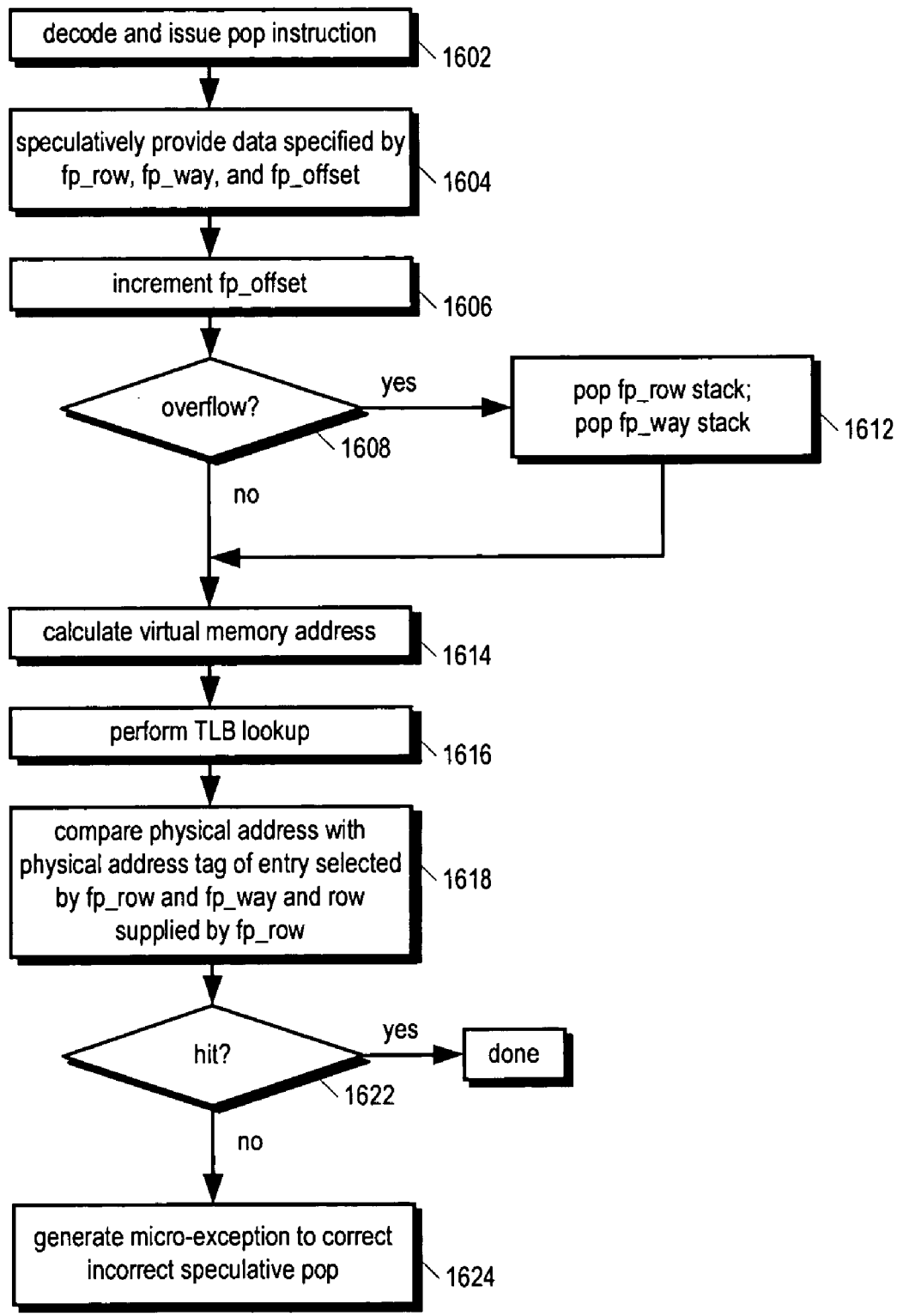
FIG. 16 is a flowchart illustrating a fast pop operation from the data cache of FIG. 15 according to the present invention.

Referring now to FIG. 16, a flowchart illustrating a fast pop operation from the data cache 1402 of FIG. 15 according to the present invention is shown. Flow begins at block 1602.

At block 1602, instruction translator 106 decodes a pop instruction and instruction scheduler 108 issues the pop instruction to the load unit of execution units 114 of FIG. 14. In response, the load unit generates a true value on pop_instr signal 344. Flow proceeds to block 1604.

At block 1604, in response to the true value on pop_instr signal 344, control logic 1502 generates a true value on fast_pop signal 1564. Consequently, multiplexer 1512 selects fp_row 1556 for provision on row signal 1552 to row decoder 1506. In response, row decoder 1506 generates a true value on one of the read[N-1:0] signals 1542 specified by fp_row 1556. In response, storage element array 1504 outputs the row of the true read[N-1:0] signal on output 1594. In response to the true value on fast_pop signal 1564, multiplexer 1526 selects the fp_way input 1584 for provision on mux select signal 1596, which is provided to multiplexer 1528. In response, multiplexer 1528 selects the cache line from the way specified by fp_way 1584 for output on signal 1592. Multiplexer 318 selects the appropriate dword from the cache line 1592 output by multiplexer 1528 for provision on bus 138 based on the value currently stored in fp_offset register 322 for provision on bus 138 to the load unit of execution units 114 for provision to the pop instruction, which write-back stage 116 subsequently loads into one of the registers of register file 112 of FIG. 14 specified in the pop instruction. For example, if the pop instruction is an x86 RET instruction, then the pop data is loaded into the instruction pointer register of register file 112. For example, if the pop instruction is an x86 LEAVE instruction, then the pop data is loaded into the x86 EBP of register file 112. For example, if the pop instruction is an x86 POP instruction, then the pop data is loaded into the register of register file 112 specified in the POP instruction. As may be observed from FIG. 16, the data is provided to the load unit speculatively. The operation is speculative because it has not yet been verified that the source address of the pop instruction, which will be subsequently generated on physical address 336 at block 1616, is the same as the address of the pop data provided from the entry of storage element array 1504 specified by fp_row 1556 and fp_way 1584 to the load unit. Flow proceeds to block 1606.

At block 1606, control logic 1502 generates a true value on increment signal 386, and arithmetic unit 304 responsively increments fp_offset 396 and provides the incremented value on output 372, which control logic 1502 causes multiplexer 316 to select via control signal 368 for loading into fp_offset register 322. Flow proceeds to decision block 1608.

At decision block 1608, control logic 1502 examines overflow signal 392 to determine whether the increment operation performed at block 1606 caused an overflow of fp_offset 322. That is, control logic 1502 determines whether the pop instruction will cause the stack pointer 152 to wrap to the next cache line. If so, flow proceeds to block 1612; otherwise, flow proceeds to block 1614.

At block 1612, control logic 1502 generates a true value on pop_row signal 1558 to pop the top entry off fp_row stack 1516, and control logic 1502 generates a true value on pop_way signal 1586 to pop the top entry off fp_way stack 1534. The top entries are popped off to keep them consistent with the system memory cache, since the last dword in the cache line stored in the entry of storage element array 1504 specified by the top entry 1514 of fp_row stack 1516 and the top entry 1532 of fp_way stack 1534 is now being popped off the system memory stack by the pop instruction. In one embodiment, block 1612 is not performed until block 1618, described below, has been performed. In one embodiment, the fp_row 1556 and fp_way 1584 value used at block 1604 is saved for subsequent use at block 1618. Flow proceeds to block 1614.

At block 1614, address generator 306 calculates the source virtual address 334 of the pop instruction. Flow proceeds to block 1616.

At block 1616, TLB 308 generates the source physical address 336 of the pop instruction. Flow proceeds to block 1618.

At block 1618, check logic 1508 compares the corresponding portion of physical address 336 generated at block 1616 with the tag 1574 selected by fp_way 1584, and compares the corresponding portion of physical address 336 with fp_row 1556, and compares the corresponding portion of physical address 336 with fp_offset 396, and checks the valid 1576 selected by fp_way 1584 to generate fp_check signal 1544, which is provided to control logic 1502. Flow proceeds to decision block 1622.

At decision block 1622, control logic 1502 examines fp_check signal 1544 to determine whether the pop instruction source physical address 336 hits in the entry of storage element array 1504 specified by the top entries of fp_row stack 1516 and fp_way stack 1534. If the pop instruction source address 336 hits in the entry of storage element array 1504 specified by the top entry of fp_row stack 1516 and fp_way stack 1534, flow ends, i.e., the speculative fast pop operation provided the correct pop data. Otherwise, flow proceeds to block 1624.

At block 1624, control logic 1502 generates a true value on exception signal 399 to cause microprocessor 1400 to branch to an exception handler for handling the condition in which the speculative fast pop operation provided the incorrect pop data. The exception handler causes the correct data to be provided to the pop instruction. In one embodiment, the exception handler flushes fp_row stack 1516 and fp_way stack 1534 and loads the current value of bits [5:2] of the stack pointer register 152 into fp_offset register 322. Flow ends at block 1624.

As may be observed, and as will be discussed in more detail below with respect to FIG. 19, the fast pop operation described with respect to FIG. 16 enables pop data to be provided to a pop instruction potentially multiple clock cycles faster with a conventional cache memory than without the fast pop apparatus.

Figure 17:
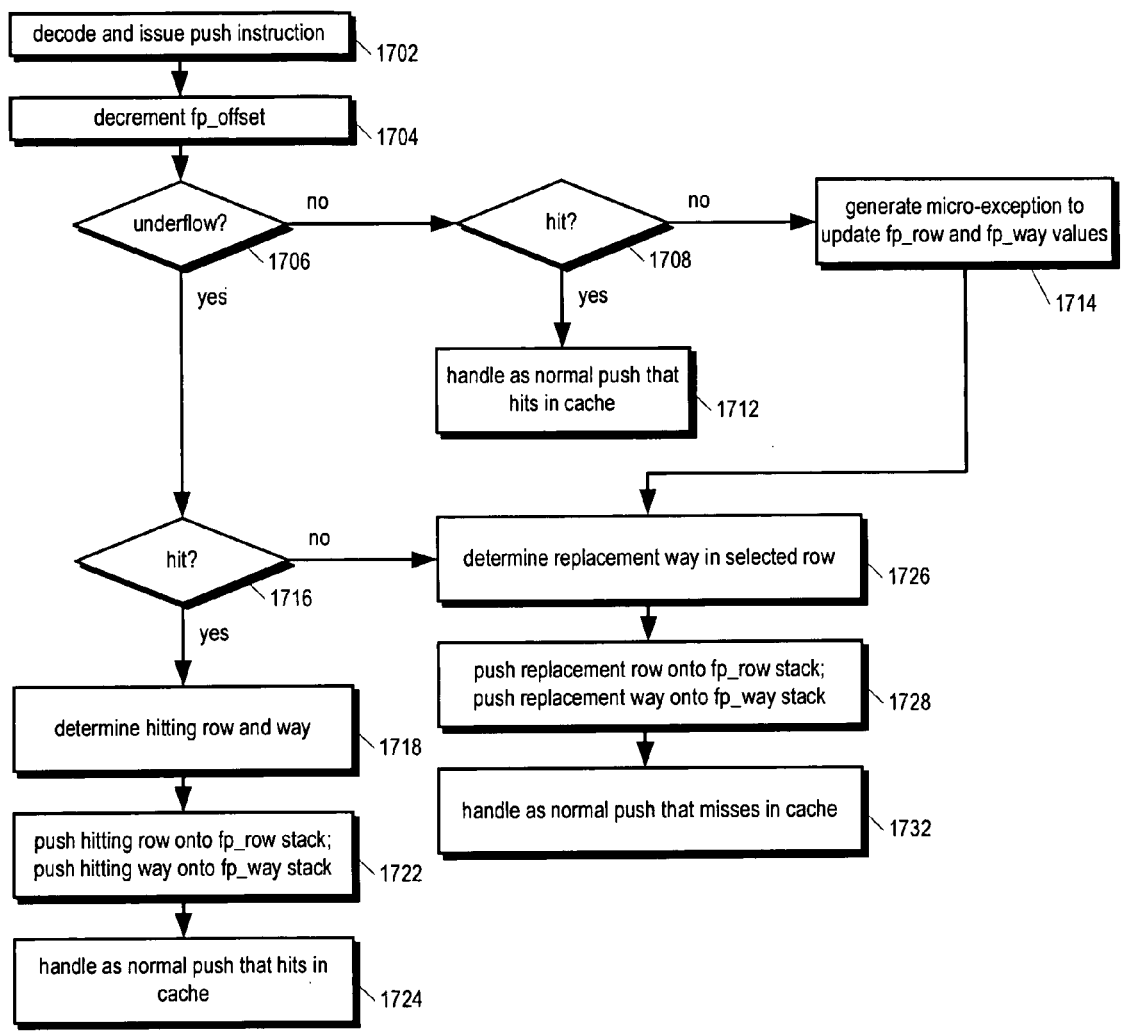
FIG. 17 is a flowchart illustrating a push operation to the data cache of FIG. 15 according to the present invention.

Referring now to FIG. 17, a flowchart illustrating a push operation to the data cache 1402 of FIG. 15 according to the present invention is shown. Flow begins at block 1702.

At block 1702, instruction translator 106 decodes a push instruction and instruction scheduler 108 issues the push instruction to the store unit of execution units 114. In response, store unit generates a true value on push_instr signal 342. Flow proceeds to block 1704.

At block 1704, control logic 1502 generates a true value on decrement signal 384, and arithmetic unit 304 responsively decrements fp_offset 396 and provides the decremented value on output 372, which control logic 1502 causes multiplexer 316 to select via control signal 368 for loading into fp_offset register 322. Flow proceeds to decision block 1706.

At decision block 1706, control logic 1502 examines underflow signal 388 to determine whether the decrement of fp_offset 396 at block 1704 caused and underflow of fp_offset 322. That is, control logic 1502 determines whether the push instruction will cause the stack pointer 152 to wrap to the previous cache line. If so, flow proceeds to decision block 1716; otherwise, flow proceeds to decision block 1708.

At decision block 1708, control logic 1502 examines cache_hit signal 1572 to determine whether the push instruction destination physical address 336 hits in storage element array 1504. If so, flow proceeds to block 1712; otherwise, flow proceeds to block 1714.

At block 1712, data cache 1402 handles the push instruction as a normal push instruction that hits in data cache 1402. That is, data cache 1402 handles the push instruction according to conventional methods well-known in the art of data caches. There is no need to update fp_row stack 1516 and fp_way stack 1534 since the push did not wrap to a previous cache line; hence, a subsequent pop operation is highly likely to specify data in the cache line specified by the top entry 1514 of fp_row stack 1516 and top entry 1532 of fp_way stack 1534. Flow ends at block 1712.

At block 1714, control logic 1502 generates a true value on exception signal 399 to cause microprocessor 1400 to branch to an exception handler to update fp_row stack 1516 and fp_way stack 1534. In one embodiment, the exception handler flushes fp_row stack 1516 and fp_way stack 1534 and loads the current value of bits [5:2] of the stack pointer register 152 into fp_offset register 322. Flow proceeds to block 1726.

At decision block 1716, control logic 1502 examines cache_hit signal 1572 to determine whether the push instruction destination physical address 336 hits in storage element array 1504. If so, flow proceeds to block 1718; otherwise, flow proceeds to block 1726.

At block 1718, control logic 1502 determines the row and way that hit in storage element array 1504. The row is specified by index 1548. The way is specified by normal_way_select 1578. Control logic 1502 provides the hitting way on new_way signal 1582 to fp_way stack 1534. Additionally, control logic 1502 provides the hitting row on new_row signal 1554 to fp_row stack 1516. Flow proceeds to block 1722.

At block 1722, control logic 1502 generates a true value on push_row signal 1562 to push the value provided on new_row 1554 onto fp_row stack 1516. Control logic 1502 also generates a true value on push_way signal 1588 to push the value provided on new_way 1582 onto fp_way stack 1534. Flow proceeds to block 1724.

At block 1724, data cache 1402 handles the push instruction as a normal push instruction that hits in data cache 1402. That is, after the fp_row stack 1516 and fp_way stack 1534 are updated at block 1722, data cache 1402 handles the push instruction according to conventional methods well-known in the art of data caches. Flow ends at block 1724.

At block 1726, control logic 1502 determines the way in the row of storage element array 1504 selected by index 1548 to be replaced by the cache line implicated by the missing push address 336 that must now be fetched into data cache 1402. In one embodiment, control logic 1502 selects the least recently used way of the selected row. Control logic 1502 provides the replacement way on new_way signal 1582 to fp_way stack 1534. Additionally, control logic 1502 provides the row specified by index 1548 on new_row signal 1554 to fp_row stack 1516. Flow proceeds to block 1728.

At block 1728, control logic 1502 generates a true value on push_row signal 1562 to push the value provided on new_row 1554 onto fp_row stack 1516. Control logic 1502 also generates a true value on push_way signal 1588 to push the value provided on new_way 1582 onto fp_way stack 1534. Flow proceeds to block 1732.

At block 1732, data cache 1402 handles the push instruction as a normal push instruction that misses in data cache 1402. That is, after the fp_row stack 1516 and fp_way stack 1534 are updated at block 1728, data cache 1402 handles the push instruction according to conventional methods well-known in the art of data caches. Flow ends at block 1732.

Figure 18:
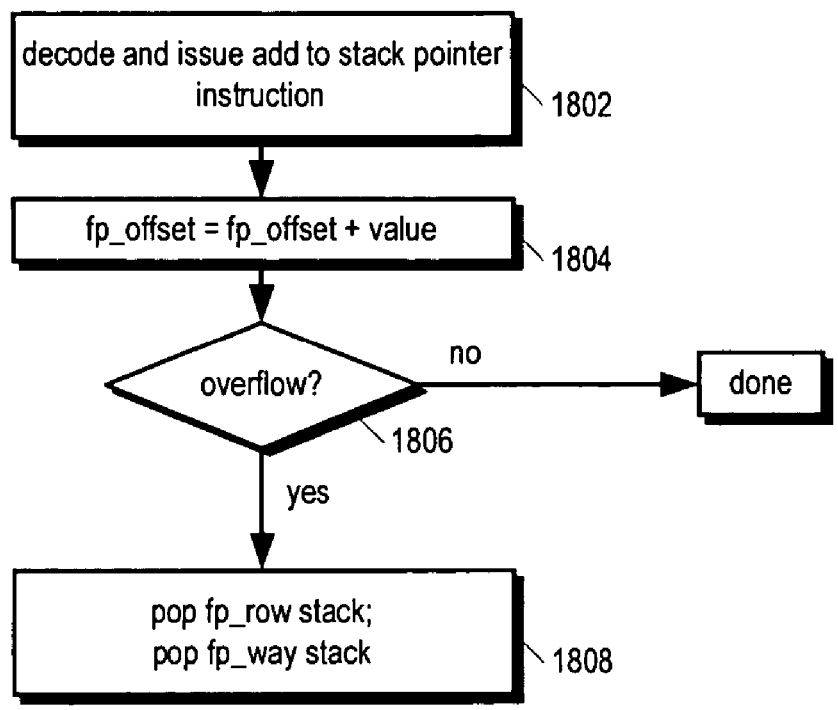
FIG. 18 is a flowchart illustrating operation of the microprocessor of FIG. 14 in response to an add to stack pointer instruction according to the present invention.

Referring now to FIG. 18, a flowchart illustrating operation of microprocessor 1400 of FIG. 14 in response to an add to stack pointer instruction according to the present invention is shown. Flow begins in FIG. 18 at block 1802.

At block 1802, instruction translator 106 decodes an add instruction whose destination is stack pointer register 152 of FIG. 14 and instruction scheduler 108 issues the add instruction to the integer unit of execution units 114. In response, the integer unit generates a true value on add_sp_instr signal 352. Flow proceeds to block 1804.

At block 1804, control logic 1502 generates a true value on add signal 382, and arithmetic unit 304 responsively adds add_sp_val 394 to fp_offset 396 and provides the sum on output 372, which control logic 1502 causes multiplexer 316 to select via control signal 368 for loading into fp_offset register 322. Flow proceeds to decision block 1806.

At decision block 1806, control logic 1502 examines overflow signal 392 to determine whether the add operation performed at block 1804 caused an overflow of fp_offset 322. That is, control logic 1502 determines whether the add instruction will cause the stack pointer 152 to wrap to another cache line. At block 1806, an overflow condition is a condition in which the add causes stack pointer 152 to no longer reference the cache line stored in the entry of data cache 1402 specified by fp_row stack 1516 top entry 1514 and fp_way stack 1534 top entry 1532. In particular, if the add causes an overflow, stack pointer 152 typically references the cache line whose memory address is immediately adjacent to and greater than the memory address of the cache line stored in the entry of data cache 1402 specified by fp_row stack 1516 top entry 1514 and fp_way stack 1534 top entry 1532. Consequently, fp_row stack 1516 and fp_way stack 1534 must be popped in order for the correct cache line to be specified by fp_row stack 1516 top entry 1514 and fp_way stack 1534 top entry 1532. In one embodiment, control logic 1502 accommodates an add to stack pointer 152 that overflows more than one cache line. In this embodiment, the number of entries, N, popped from fp_row stack 1516 and fp_way stack 1534 at block 1808 below is calculated as follows, assuming a cache line size of 64 bytes:

$$N=(fp\_offset+add\_sp\_val)/64$$

Hence, if N is greater than 1, then an overflow has occurred. If an overflow condition occurred, flow proceeds to block 1808; otherwise flow ends.

At block 1808, control logic 1502 generates a true value on pop_row signal 1558 to pop the top entry off fp_row stack 1516, and control logic 1502 generates a true value on pop_way signal 1586 to pop the top entry off fp_way stack 1534. As discussed above with respect to block 1806, in one embodiment, the value of N is calculated, and N entries are popped from fp_row stack 1516 and fp_way stack 1534. Flow ends at block 1808.

Figure 19:
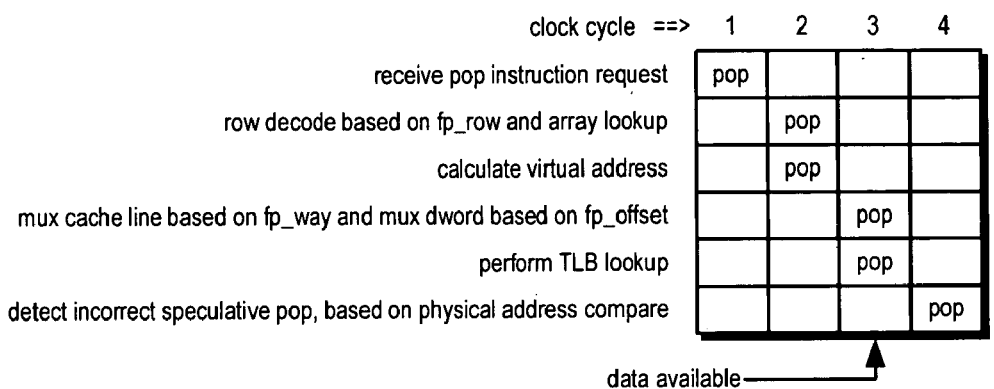
FIG. 19 is a timing diagram illustrating the timing of a fast pop operation of FIG. 16 from the data cache of FIG. 15 according to the present invention.

Referring now to FIG. 19, a timing diagram illustrating the timing of a fast pop operation of FIG. 16 from the data cache 1402 of FIG. 15 according to the present invention is shown. FIG. 19 includes four columns denoted 1 through 4, corresponding to four clock cycles of microprocessor 1400. FIG. 19 also includes six rows each labeled to signify a distinct action or result of microprocessor 1400. Each rectangle of a given row and column of FIG. 19 is either blank or includes the word "pop" to indicate the location of the pop instruction as it proceeds down the microprocessor 1400 pipeline.

In clock cycle 1, according to the first row of FIG. 19, the load unit of execution units 114 generates a true value on pop_instr signal 344 to request pop data for a pop instruction, according to block 1602 of FIG. 16.

In clock cycle 2, according to the second row, row decoder 1506 decodes the row value provided on fp_row signal 1556 to generate a true value on one of the read[N-1:0] signals 1542, according to block 1604 of FIG. 16. In response, storage element array 1504 provides the cache line, tag and status of each entry in the four ways of the row selected by the true read[N-1:0] signal 1542, according to block 1604 of FIG. 16.

In clock cycle 2, according to the third row, address generator 306 calculates virtual address 334, according to block 1614 of FIG. 16.

In clock cycle 3, according to the fourth row, multiplexer 1528 muxes out the cache line 1592 specified by fp_way 1584 and multiplexer 318 muxes out the appropriate dword of the selected cache line 1592 specified by fp_offset 396, according to block 1604 of FIG. 16. In one embodiment, the appropriate dword of the selected cache line 1592 specified by the lower bits [5:2] of physical address 336 are muxed out.

In clock cycle 3, according to the fifth row, TLB 308 generates the source physical address 336 of the pop instruction, according to block 1616 of FIG. 16.

In clock cycle 4, according to the sixth row, control logic 1502 examines fp_check 1544 to determine whether an incorrect speculative pop operation has been performed, according to blocks 1618 through 1624 of FIG. 16.

In one embodiment, the timing of a load instruction with respect to the data cache 1402 of FIG. 15 is similar to the timing of a load instruction with respect to non-stack cache 122 of FIG. 1; hence, FIG. 13 describes the timing of a load instruction with respect to the data cache 1402. As may be seen by comparing FIG. 19 with FIG. 13, the fast pop operation of FIG. 16 advantageously enables data cache 1402 to potentially provide data for pop instructions multiple clock cycles sooner than a conventional cache, which does not include the fast pop apparatus of FIG. 15, and which does not distinguish between pop instructions and load instructions.

In one embodiment, bits [5:2] of virtual address 334 are used to select the dword rather than fp_offset 396.

Although the present invention and its objects, features and advantages have been described in detail, other embodiments are encompassed by the invention. For example, the stack cache or LIFO memory may be embodied in various ways to accomplish a memory that functions as a last-in-first-out memory. One example embodiment is a register file functioning as a circular FIFO memory for which top and bottom of stack pointers are maintained in order to determine which entry is to be pushed or popped next and when the stack has been emptied. Furthermore, although embodiments have been described with respect to x86 architecture instructions, in which the stack grows toward decreasing memory addresses, the present invention may be employed in other microprocessors that have stack access instructions in which the stack grows toward increasing memory addresses. In addition, although embodiments of a particular cache line size are disclosed, caches with various line sizes may be employed.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a tangible computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known tangible computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A cache memory, comprising:
   a last-in-first-out (LIFO) memory, for caching lines of data implicated by destination addresses of push instructions, said LIFO memory having a top entry for storing a cache line implicated by a destination address of a most recent push instruction;
   an input, coupled to said LIFO memory, for indicating that an instruction requesting data from the cache memory is a pop instruction specifying a source address of said data; and
   logic, coupled to said input, for controlling said LIFO memory to speculatively provide said data to said pop instruction from said top entry in response to said input, prior to determining whether said source address matches an address of said cache line stored in said top entry.

2. The cache memory of claim 1, further comprising:
   a comparator, coupled to said logic, for comparing said source address with said address of said cache line stored in said top entry, after said logic controls said LIFO memory to speculatively provide said data to said pop instruction.

3. The cache memory of claim 2, further comprising:
   an output, coupled to said logic, for indicating that said LIFO memory incorrectly speculatively provided said data to said pop instruction, if said comparator indicates said source address of said pop instruction does not match said address of said cache line stored in said top entry.

4. The cache memory of claim 3, wherein said output indicates an exception condition.

5. The cache memory of claim 1, wherein said pop instruction comprises an x86 POP instruction.

6. The cache memory of claim 1, wherein said pop instruction comprises an x86 RET instruction.

7. The cache memory of claim 1, wherein said pop instruction comprises an x86 LEAVE instruction.

8. The cache memory of claim 1, wherein said pop instruction comprises an instruction for popping said data from a stack in a system memory coupled to a microprocessor comprising the cache memory.

9. The cache memory of claim 8, wherein said data popped from said stack memory comprises a return address.

10. The cache memory of claim 8, wherein said cache line comprises a number of bytes of data equal to a smallest number of bytes transferred between the cache memory and said system memory.

11. The cache memory of claim 8, wherein said destination address of said most recent push instruction comprises an address in said stack in said system memory.

12. The cache memory of claim 8, wherein said source address of said pop instruction comprises an address in said stack in said system memory.

13. The cache memory of claim 1, wherein said cache line comprises a first number of bytes of data, wherein said data provided to said pop instruction comprises a second number of bytes, wherein said first number of bytes is at least twice as much as said second number of bytes.

14. The cache memory of claim 1, wherein the cache memory maintains coherency of said lines of data cached therein with respect to other memories in a system comprising the cache memory.

15. The cache memory of claim 1, further comprising:
   an offset, coupled for provision to said logic, for specifying a location within said top entry cache line of data specified by said most recent push instruction.

16. The cache memory of claim 15, wherein said logic controls said LIFO memory to speculatively provide said data from said location within said top entry cache line of data specified by said offset.

17. The cache memory of claim 16, wherein if updating said offset in response to said pop instruction causes said offset to wrap beyond said top entry cache line, said logic causes said LIFO memory to shift said top entry out of said LIFO memory.

18. The cache memory of claim 15, wherein if updating said offset prior to storing said data specified by said most recent push instruction causes said offset to wrap below said top entry cache line, said logic causes said LIFO memory to shift down, thereby creating a new top entry, wherein said logic stores said data specified by said most recent push instruction into said new top entry at said location specified by said offset.

19. The cache memory of claim 15, further comprising:
an arithmetic unit, coupled to said logic, for updating said offset.

20. The cache memory of claim 19, wherein said arithmetic unit updating said offset comprises said arithmetic unit adding to said offset an operand specified by an instruction, wherein said instruction specifies adding said operand to a stack pointer register of a microprocessor comprising the cache memory.

21. The cache memory of claim 20, wherein if updating said offset causes said offset to wrap beyond said top entry cache line, said logic causes said LIFO memory to shift said top entry out of said LIFO memory.

22. The cache memory of claim 1, wherein said most recent push instruction is most recent with respect to said cache lines of data stored in said LIFO memory.

23. The cache memory of claim 1, wherein said most recent push instruction is most recent with respect to not yet popped data stored in said LIFO memory.

24. The cache memory of claim 1, wherein said cache line implicated by said destination address of said most recent push instruction comprises data of a most recent push instruction whose data has not yet been popped from a stack in a system memory.

25. A cache memory, comprising:
an input, for indicating a type of an instruction reading data from the cache memory, said instruction specifying a source address of said data;
a last-in-first-out (LIFO) memory, coupled to said input, having a plurality of entries, each for storing a cache line of data implicated by a push instruction, having a top one of said plurality of entries for storing a cache line of data implicated by a most recent push instruction, wherein in response to said input indicating said instruction is a pop instruction, the cache memory provides data for said pop instruction from said top entry of said LIFO memory; and
a comparator, coupled to receive said source address, for generating an indication of whether said source address matches an address of said cache line stored in said top entry of said LIFO memory for determining whether said data provided for said pop instruction is correct data.

26. The cache memory of claim 25, wherein the cache memory provides said source data for said pop instruction from said top entry of said LIFO memory during a first clock cycle, wherein said comparator generates said indication during a second clock cycle.

27. The cache memory of claim 26, wherein said second clock cycle is subsequent to said first clock cycle.

28. The cache memory of claim 26, wherein said second clock cycle is not sooner than said first clock cycle.

29. The cache memory of claim 25, wherein said most recent push instruction is most recent with respect to said cache lines of data stored in said LIFO memory.

30. The cache memory of claim 25, further comprising:
an output, coupled to said comparator, for indicating said data provided for said pop instruction is incorrect data, if said source address does not match said address of said cache line stored in said top entry of said LIFO memory.

31. The cache memory of claim 25, further comprising:
an offset, coupled to said LIFO memory, for specifying a location within said cache line stored in said top entry of said data provided by the cache memory for said pop instruction.

32. The cache memory of claim 31, further comprising:
a multiplexer, coupled to said offset, for selecting said data from within said cache line based on said offset.

33. The cache memory of claim 25, wherein said source address and said address of said cache line stored in said top entry comprises physical memory addresses.

34. The cache memory of claim 25, wherein said LIFO memory also stores addresses of said lines of data cached therein, wherein the cache memory further comprises:
a plurality of comparators, coupled to receive said source address, for comparing said source address with said addresses of said lines of data cached in said LIFO memory, wherein said source address specifies a load address of load data specified by a load instruction.

35. The cache memory of claim 34, further comprising:
an output, coupled to said plurality of comparators, for indicating said load address hits in the cache memory if said plurality of comparators indicates said load instruction source address matches one of said addresses of said lines of data cached in said LIFO memory.

36. The cache memory of claim 25, a computer program product comprising a computer usable medium having computer readable program code causes the cache memory, wherein said computer program product is for use with a computing device.

37. The cache memory of claim 25, wherein a computer data signal embodied in a transmission medium comprising computer-readable program code provides the cache memory.

38. A cache memory, comprising:
a first plurality of storage elements, configured as a random access cache, for caching data specified by non-push instructions;
a second plurality of storage elements, configured as a stack cache, for caching lines of data implicated by destination addresses of push instructions, said stack cache having a top entry for storing a cache line implicated by a destination address of a most recent push instruction;
an input, for indicating that an instruction requesting data from the cache memory is a pop instruction specifying a source address of said data; and
logic, coupled to said input and to said first and second plurality of storage elements, for controlling said stack cache to speculatively provide said data to said pop instruction from said top entry in response to said input, prior to determining whether said source address matches an address of said cache line stored in said top entry.

39. A method for caching stack memory data, comprising:
storing into a cache memory, data specified by a push instruction and a destination address of the data in a stack memory;
decoding a pop instruction, subsequent to said storing;
generating a source address of data for the pop instruction, in response to said decoding;
comparing the source address with the destination address stored in the cache memory, after said generating; and
providing the data stored in the cache memory, without regard to said comparing, in response to said decoding.

40. The method of claim 39, further comprising:
determining the source address is not present in the cache memory, in response to said comparing; and
correcting for said providing the data, in response to said determining.

41. The method of claim 40, wherein said correcting comprises:
fetching from a stack memory other than the cache memory, correct data specified by the source address.

42. The method of claim 41, wherein said correcting further comprises:
generating a microprocessor exception, prior to said fetching.

43. The method of claim 39, wherein the cache memory is arranged as a last-in-first-out memory having a last-in entry, wherein said providing the data comprises:
providing the data stored in the last-in entry of the cache memory.

44. The method of claim 43, wherein the last-in entry is configured to store a cache line comprising a plurality of data words.

45. The method of claim 44, further comprising:
popping the last-in-first-out memory after said providing the data, if said speculatively providing comprises providing a last of the plurality of data words stored in the cache line stored in the last-in entry.

46. The method of claim 44, further comprising:
pushing down the last-in-first-out memory, prior to said storing, if the destination address misses in the cache memory.

47. The method of claim 39, wherein said providing is performed at least as soon as said comparing.

48. A method for speculatively providing data from a cache memory to a pop instruction, comprising:
storing first data specified by a destination address of a push instruction into a top entry of a last-in-first-out (LIFO) memory;
receiving a request from a pop instruction for second data specified by a source address, after said storing the first data;
providing the first data from the top entry of the LIFO memory without reference to the source address, in response to said receiving the request;
comparing the source address and the destination address; and
determining whether the first data is the second data, subsequent to said providing the first data, in response to said comparing.

49. The method of claim 48, further comprising:
generating an output for indicating the first data is not the second data, if the source address does not match the destination address.

50. The method of claim 49, further comprising:
providing the second data to the pop instruction after said generating the output.

51. The method of claim 50, further comprising:
executing an exception routine to perform said providing the second data.

52. The method of claim 48, further comprising:
performing a virtual to physical page address translation to generate the source address, no sooner than said providing the first data.

53. A computer program product embodied on a computer-readable medium, comprising:
computer-readable program code for providing a cache memory, said program code comprising:
first program code for providing an input, for indicating a type of an instruction reading data from the cache memory, said instruction specifying a source address of said data;
second program code for providing a last-in-first-out (LIFO) memory, coupled to said input, having a plurality of entries, each for storing a cache line of data implicated by a push instruction, having a top one of said plurality of entries for storing a cache line of data implicated by a most recent push instruction, wherein in response to said input indicating said instruction is a pop instruction, the cache memory provides data for said pop instruction from said top entry of said LIFO memory; and
third program code for providing a comparator, coupled to receive said source address, for generating an indication of whether said source address matches an address of said cache line stored in said top entry of said LIFO memory for determining whether said data provided for said pop instruction is correct data.

* * * * *